US009894575B2

(12) United States Patent
Masini et al.

(10) Patent No.: US 9,894,575 B2
(45) Date of Patent: Feb. 13, 2018

(54) METHODS AND ARRANGEMENTS FOR ENABLING CONTINUATION OF ONGOING POSITIONING MEASUREMENTS AT HANDOVER

(71) Applicant: Telefonaktiebolaget L M Ericsson (publ), Stockholm (SE)

(72) Inventors: Gino Luca Masini, Stockholm (SE); Martin Israelsson, Spånga (SE); Elena Myhre, Järfälla (SE); Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/889,777

(22) PCT Filed: Feb. 26, 2014

(86) PCT No.: PCT/SE2014/050233
§ 371 (c)(1),
(2) Date: Nov. 6, 2015

(87) PCT Pub. No.: WO2014/182214
PCT Pub. Date: Nov. 13, 2014

(65) Prior Publication Data
US 2016/0105831 A1  Apr. 14, 2016

Related U.S. Application Data

(60) Provisional application No. 61/821,946, filed on May 10, 2013.

(51) Int. Cl.
*H04W 36/00* (2009.01)
*H04W 36/08* (2009.01)
(Continued)

(52) U.S. Cl.
CPC ....... *H04W 36/08* (2013.01); *H04W 36/0055* (2013.01); *H04W 36/24* (2013.01); *H04W 64/00* (2013.01); *H04W 76/046* (2013.01)

(58) Field of Classification Search
CPC ..... H04W 36/08; H04W 36/24; H04W 64/00; H04W 76/046
(Continued)

(56) References Cited

U.S. PATENT DOCUMENTS 6,366,781 B1 * 4/2002 Hussain ................ H04W 36/32
455/436
8,488,586 B2 * 7/2013 Centonza .............. H04W 8/005
370/350
(Continued)

OTHER PUBLICATIONS

Unknown, Author, "3GPP TS 36.133 V11.4.0 (Mar. 2013)", 3rd Generation Partnership Project; Technical Specification Group Radio Access Network; Evolved Universal Terrestrial Radio Access (E-UTRA); Requirements for support of radio resource management (Release 11), Mar. 2013, pp. 1-676.
(Continued)

*Primary Examiner* — Marceau Milord
(74) *Attorney, Agent, or Firm* — Murphy, Bilak & Homiller, PLLC

(57) ABSTRACT

According to one of the aspects of the proposed technology, there is provided a method for enabling continuation of ongoing positioning measurements for a User Equipment, UE, at handover from a source base station to a separate target base station. The method comprises the steps of obtaining (11) a measurement context associated with the ongoing positioning measurements to enable continued positioning measurements in a target cell of the target base station after the handover has been completed, and participating (12) in continued positioning measurements in the
(Continued)

target cell after the handover in response to the measurement context.

26 Claims, 18 Drawing Sheets

(51) Int. Cl.
   *H04W 64/00* (2009.01)
   *H04W 36/24* (2009.01)
   *H04W 76/04* (2009.01)

(58) Field of Classification Search
   USPC ....... 455/436, 456.3, 456.5, 437, 442, 67.11, 455/63.1
   See application file for complete search history.

(56) References Cited

U.S. PATENT DOCUMENTS

| | | | | |
|---|---|---|---|---|
| 8,929,894 | B2* | 1/2015 | Catovic | H04W 36/30 370/216 |
| 9,179,388 | B2* | 11/2015 | Yu | H04W 36/32 |
| 9,294,963 | B2* | 3/2016 | Masini | H04W 36/0083 |
| 9,326,218 | B2* | 4/2016 | Gunnarsson | H04W 92/20 |
| 9,344,991 | B2* | 5/2016 | Edge | H04W 64/00 |
| 9,451,530 | B2* | 9/2016 | Gunnarsson | H04W 92/20 |
| 9,510,262 | B2* | 11/2016 | Brisebois | H04W 48/16 |
| 9,648,573 | B2* | 5/2017 | Siomina | H04W 56/001 |
| 2011/0044284 | A1* | 2/2011 | Voltolina | H04W 24/02 370/331 |
| 2011/0080890 | A1* | 4/2011 | Cai | H04W 36/0033 370/331 |
| 2012/0164979 | A1* | 6/2012 | Bachmann | H04L 63/164 455/411 |
| 2012/0236776 | A1* | 9/2012 | Zhang | H04W 48/12 370/312 |
| 2013/0215772 | A1* | 8/2013 | Kaur | H04W 36/0072 370/252 |
| 2013/0281097 | A1* | 10/2013 | Jung | H04W 36/0072 455/444 |
| 2014/0038616 | A1* | 2/2014 | Burbidge | H04W 36/18 455/442 |
| 2014/0057634 | A1* | 2/2014 | Chang | H04W 36/0083 455/437 |
| 2014/0078973 | A1* | 3/2014 | Kazmi | H04W 8/22 370/329 |
| 2014/0211756 | A1* | 7/2014 | Bontu | H04W 36/04 370/331 |
| 2014/0211762 | A1* | 7/2014 | Bontu | H04W 36/30 370/332 |
| 2014/0301360 | A1* | 10/2014 | Bontu | H04W 36/0083 370/331 |
| 2015/0009802 | A1* | 1/2015 | Wager | H04W 76/027 370/218 |
| 2015/0117283 | A1* | 4/2015 | Wei | H04W 36/0088 370/311 |
| 2015/0319627 | A1* | 11/2015 | Jung | H04W 48/20 370/328 |
| 2016/0007255 | A1* | 1/2016 | Sharma | H04W 36/08 370/331 |

OTHER PUBLICATIONS

Unknown, Author, "3GPP TS 36.300 V11.5.0 (Mar. 2013)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Mar. 2013, pp. 1-209.

Unknown, Author, "3GPP TS 36.305 V11.3.0 (Mar. 2013)", 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11), Mar. 2013, pp. 1-58.

Unknown, Author, "3GPP TS 36.331 V11.3.0 (Mar. 2013)", 3rd Generation Partnership Project; Technical Specification Group Radio Access Network; Evolved Universal Terrestrial Radio Access (E-UTRA); Radio Resource Control (RRC); Protocol specification (Release 11), Mar. 2013, pp. 1-344.

Unknown, Author, "3GPP TS 36.355 V11.2.0 (Mar. 2013)", 3rd Generation Partnership Project; Technical Specification Group Radio Access Network; Evolved Universal Terrestrial Radio Access (E-UTRA); LTE Positioning Protocol (LPP) (Release 11), Mar. 2013, pp. 1-119.

Unknown, Author, "3GPP TS 36.413 V11.3.0 (Mar. 2013)", 3rd Generation Partnership Project; Technical Specification Group Radio Access Network; Evolved Universal Terrestrial Radio Access Network (E-UTRAN); S1 Application Protocol (S1AP) (Release 11), Mar. 2013, pp. 1-274.

Unknown, Author, "3GPP TS 36.423 V11.4.0 (Mar. 2013)", 3rd Generation Partnership Project; Technical Specification Group Radio Access Network; Evolved Universal Terrestrial Radio Access Network (E-UTRAN); X2 application protocol (X2AP) (Release 11), Mar. 2013, pp. 1-143.

Unknown, Author, "3GPP TS 36.455 V11.2.0 (Mar. 2013)", 3rd Generation Partnership; Technical Specification Group Radio Access Network; Evolved Universal Terrestrial Radio Access (E-UTRA); LET Positioning Protocol A (LPPa) (Release 11), Mar. 2013, pp. 1-52.

Unknown, Author, "Discussion of E-CID Positioning during Handover", 3GPP TSG RAN WG3 Meeting #79bis, R3-130507, Huawei, Chicago, USA, Apr. 15-19, 2013, pp. 1-4.

Unknown, Author, "E-CID Positioning Measurements and Handovers", 3GPP TSG-RAN WG3 #80, R3-130933, Ericsson, Fukuoka, Japan, May 20-24, 2013, pp. 1-3.

Unknown, Author, "Further Discussion on E-CID Positioning during Handover", 3GPP TSG RAN WG3 Meeting #80, R3-130887, Huawei, Fukuoka, Japan, May 20-24, 2013, pp. 1-4.

Unknown, Author, "LS on UE Rx-Tx Time Difference Measurement Requirement under Handover", 3GPP TSG RAN WG3 Meeting #79bis, R3-130453, Chicago, USA, Apr. 15-19, 2013, 1 page.

Unknown, Author, "LS on UE Rx-Tx Time Difference Measurement Requirement under Handover", 3GPP TSG-RAN WG2 Meeting #80, Tdoc R3-130934, Ericsson, Fukuoka, Japan, May 20-24, 2013, 1 page.

Unknown, Author, "Response LS on UE Rx-Tx Time Difference Measurement Requirement under Handover", 3GPP TSG RAN WG3 Meeting #80, R3-131175, Fukuoka, Japan, May 20-24, 2013, 1 page.

* cited by examiner

METHODS AND ARRANGEMENTS FOR ENABLING CONTINUATION OF ONGOING POSITIONING MEASUREMENTS AT HANDOVER

TECHNICAL FIELD

The proposed technology generally relates to methods for enabling continuation of ongoing positioning measurements at handover, and corresponding target base stations, source base stations, User Equipment, UE, and positioning network nodes.

BACKGROUND

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Example: E-UTRAN UE Positioning Architecture, Protocols and Procedures

The architecture in the Evolved/Enhanced Packet System, EPS, applicable to positioning of a UE with E-UTRAN access is shown in FIG. 1. This is merely an example of a UE positioning architecture, in the particular context of E-UTRAN.

Secure User Plane Location, SUPL, is a technology that utilizes existing standards where available and possible to transfer assistance data and positioning data over a User Plane bearer, such as IP, to aid network and SUPL Enabled Terminal, SET, based positioning in the determination of the position of a UE or terminal.

The E-UTRAN UE Positioning Architecture is based around a SUPL Location Platform, SLP, 131, an Enhanced Serving Mobile Location Center, E-SMLC, 130, possibly one or more Location Measurement Units, LMU(s), 133, a Mobility Management Entity, MME, 132, the considered UE/SET 120 and the relevant eNodeB 111/112.

The Mobility Management Entity, MME, receives a request for some location service associated with a particular target UE from another entity, or the MME itself decides to initiate some location service on behalf of a particular target UE (e.g., for an IMS emergency call from the UE). The MME then sends a location services request to an Enhanced Serving Mobile Location Center, E-SMLC. The E-SMLC processes the location services request which may include transferring assistance data to the target UE to assist with UE-based and/or UE-assisted positioning and/or may include positioning of the target UE. For the Uplink method, the E-SMLC processes the location services request which includes transferring configuration data to the selected Location Measurement Unit(s), LMU(s). The E-SMLC then returns the result of the location service back to the MME (e.g., a position estimate for the UE and/or an indication of any assistance data transferred to the UE). In case of a location service requested by an entity other than the MME (e.g., UE or E-SMLC), the MME returns the location service result to this entity.

The standard positioning methods supported for E-UTRAN access are:
Network-assisted GNSS methods;
Downlink positioning;
Enhanced cell ID (E-CID) method;
Uplink positioning.
Hybrid positioning, combining multiple methods from the list above, is also supported.

These positioning methods may be supported in UE-based, UE-assisted/E-SMLC-based, eNB-assisted, and LMU-assisted/E-SMLC-based versions. Table 1 below indicates which versions are currently supported.

TABLE 1

Supported versions of UE positioning methods.

| Method | UE-based | UE-assisted, E-SMLC-based | eNB-assisted | LMU-assisted/ E-SMLC-based | SUPL |
|---|---|---|---|---|---|
| A-GNSS | Yes | Yes | No | No | Yes (UE-based and UE-assisted) |
| Downlink | No | Yes | No | No | Yes (UE-assisted) |
| E-CID | No | Yes | Yes | No | Yes (UE-assisted) |
| Uplink | No | No | No | Yes | No |

Network-Assisted GNSS Methods

These methods make use of UEs that are equipped with radio receivers capable of receiving Global Navigation Satellite System, GNSS, signals. Examples of GNSS include GPS, Modernized GPS, Galileo, GLONASS, Space Based Augmentation Systems (SBAS), and Quasi Zenith Satellite System (QZSS). In this concept, different GNSSs (e.g. GPS, Galileo, etc.) can be used separately or in combination to determine the location of a UE.

Downlink Positioning

The downlink Observed Time Difference Of Arrival, OTDOA, positioning method uses the measured timing of downlink signals received from multiple eNBs at the UE. The UE measures the timing of the received signals using assistance data received from the positioning server, and the resulting measurements are used to locate the UE in relation to the neighbor eNBs.

Enhanced Cell ID (E-CID) Methods

In the Cell ID (CID) positioning method, the position of an UE is estimated with the knowledge of its serving eNB and cell. The information about the serving eNB and cell may be obtained by paging, tracking area update, or other methods. Enhanced Cell ID (E-CID) positioning refers to techniques which use additional UE and/or E UTRAN radio resource and other measurements to improve the UE location estimate. Example E-CID positioning measurements in LTE: Reference Signal Received Power, RSRP, Reference Signal Received Quality, RSRQ, UE Rx-Tx, Timing Advance Type 1, Timing Advance Type 2, and AoA. The measurements may be requested via the LTE Positioning Protocol, LPP or the LPP annex, LPPa+Radio Resource Control, RRC, protocols. In the current standard, some of the measurements, e.g. RSRP and RSRQ, may be performed on serving and/or neighbor cells, whilst other measurements (e.g., UE Rx-Tx) may be performed on primary serving cell (PCell) only. UE Rx-Tx measurement is a two-directional measurement which involves both UE and eNB, which means that eNB needs to be aware of UE transmission configuration and UE needs to be aware of eNB transmission configuration.

In cases with a requirement for close time coupling between UE and eNB measurements (e.g., timing advance type 1 and UE TX-RX time difference), the eNB configures the appropriate RRC measurements and is responsible for maintaining the required coupling between the measurements.

Uplink Positioning

The uplink (e.g. Uplink Time Difference Of Arrival, UTDOA) positioning method, a.k.a. network-based positioning, makes use of the measured timing at multiple LMUs of uplink signals transmitted from UE. The LMU measures the timing of the received signals using assistance data received from the positioning server, and the resulting measurements are used to estimate the location of the UE.

LTE Positioning Protocol (LPP)

The LTE Positioning Protocol (LPP) is terminated between a target device (i.e. the UE) and a positioning server (e.g. the E-SMLC). LPP and its procedures are defined in [7].

LTE Positioning Protocol Annex (LPPa)

The LTE Positioning Protocol Annex, LPPa, carries information between the eNB and the E-SMLC. It is used to support the following positioning functions:

E-CID cases where assistance data or measurements are transferred from the eNB to the E-SMLC Data collection from eNBs for support of downlink OTDOA positioning Retrieval of UE configuration data from the eNBs for support of uplink (e.g., UTDOA) positioning The LPPa protocol is transparent to the MME. The MME routes the LPPa PDUs transparently based on a short Routing ID corresponding to the involved E-SMLC node over S1 interface without knowledge of the involved LPPa transaction. It carries the LPPa PDUs over S1 interface either in UE associated mode or non-UE associated mode. LPPa and its procedures are defined in [2].

It is evident that positioning measurements are of critical importance for UE positioning purposes. A particular problem occurs when a UE is handed over from a source base station to a target base station during ongoing positioning measurements. At handover, there may be situations in which it is not possible to continue the ongoing positioning measurements.

SUMMARY

It is therefore desirable to overcome, or at least alleviate, problems in the prior art, e.g. to provide improved handling regarding positioning measurements when handover occurs.

It is a general object to ensure effective and/or reliable positioning measurements at handover.

In particular, it is a specific object to provide method(s) for enabling continuation of ongoing positioning measurements for a User Equipment, UE, at handover from a source base station to a separate target base station.

It is also a specific object to provide a target base station configured to enable continuation of ongoing positioning measurements at handover.

Another specific object is to provide a source base station configured to enable continuation of ongoing positioning measurements at handover.

Yet another specific object is to provide a User Equipment, UE configured to enable continuation of ongoing positioning measurements at handover.

Still another specific object is to provide a positioning network node configured to enable continuation of ongoing positioning measurements at handover.

These and other objects are met by embodiments of the proposed technology.

According to a first aspect, there is provided a method for enabling continuation of ongoing positioning measurements for a User Equipment, UE, at handover from a source base station to a separate target base station. The method comprises the steps of obtaining a measurement context associated with the ongoing positioning measurements to enable continued positioning measurements in a target cell of the target base station after the handover has been completed, and participating in continued positioning measurements in the target cell after the handover in response to the measurement context.

For example, the method may be performed by the target base station.

According to a second aspect, there is provided a method for enabling continuation of ongoing positioning measurements for a User Equipment, UE, at handover from a source base station to a separate target base station. The method comprises providing a measurement context associated with the ongoing positioning measurements to enable continued positioning measurements in a target cell of the target base station after the handover has been completed.

For example, the method may be performed by the source base station.

According to a third aspect, there is provided a method for enabling continuation of ongoing positioning measurements for a User Equipment, UE, at handover from a source base station to a separate target base station. The method comprises the step of participating in continued positioning measurements in a target cell of the target base station after the handover in response to a measurement context associated with the ongoing positioning measurement.

For example, the method may be performed by the UE or the target base station.

According to a fourth aspect, there is provided a method for enabling continuation of ongoing positioning measurements for a User Equipment, UE, at handover from a source base station to a separate target base station. The method comprises the steps of determining that the UE is subject to handover during the ongoing positioning measurements associated with the UE and the source base station, and receiving a report comprising a measurement context associated with the ongoing positioning measurements and measurement data resulting from continuation of the ongoing positioning measurements after the handover.

For example, the method may be performed by a positioning network node.

According to a fifth aspect, there is provided a target base station configured to enable continuation of ongoing positioning measurements for a User Equipment, UE, at handover from a source base station. The target base station is configured to receive a measurement context associated with the ongoing positioning measurements from the source base station to enable continued positioning measurements in a target cell of the target base station after the handover has been completed. The target base station is further configured to participate in continued positioning measurements in the target cell after the handover in response to the received measurement context.

According to a sixth aspect, there is provided a source base station configured to enable continuation of ongoing positioning measurements for a User Equipment, UE, at handover to a target base station. The source base station is configured to send a measurement context associated with the ongoing positioning measurements to the target base station to enable continued positioning measurements in a target cell of the target base station after the handover has been completed.

According to a seventh aspect, there is provided a User Equipment, UE, configured to enable continuation of ongoing positioning measurements for the UE at handover from a source base station to a separate target base station. The UE is configured to participate in continued positioning measurements in a target cell of the target base station after the handover in response to a measurement context associated with the ongoing positioning measurement.

According to an eighth aspect, there is provided a positioning network node configured to enable continuation of ongoing positioning measurements for a User Equipment, UE, at handover from a source base station to a separate target base station. The positioning network node is configured to determine that the UE is subject to handover during the ongoing positioning measurements. The positioning network node is further configured to receive a report comprising a measurement context associated with the ongoing positioning measurements and measurement data resulting from continuation of the ongoing positioning measurements after the handover.

According to a ninth aspect, there is provided a target base station for enabling continuation of ongoing positioning measurements for a User Equipment, UE, at handover from a source base station. The target base station comprises a reading module for reading a measurement context associated with the ongoing positioning measurements from the source base station to enable continued positioning measurements in a target cell of the target base station after the handover has been completed. The target base station further comprises a participation module for participating in continued positioning measurements in the target cell after the handover in response to the measurement context.

According to a tenth aspect, there is provided a source base station for enabling continuation of ongoing positioning measurements for a User Equipment, UE, at handover to a target base station. The source base station comprises a context preparation module for preparing a measurement context associated with the ongoing positioning measurements for transfer to the target base station to enable continued positioning measurements in a target cell of the target base station after the handover has been completed.

According to an eleventh aspect, there is provided a User Equipment, UE, for enabling continuation of ongoing positioning measurements for the UE at handover from a source base station to a separate target base station. The UE comprises a participation module for participating in continued positioning measurements in a target cell of the target base station after the handover in response to a measurement context associated with the ongoing positioning measurement.

According to a twelfth aspect, there is provided a positioning network node for enabling continuation of ongoing positioning measurements for a User Equipment, UE, at handover from a source base station to a separate target base station. The positioning network node comprises a determination module for determining that the UE is subject to handover during the ongoing positioning measurements. The positioning network node further comprises a reading module for reading a report comprising a measurement context associated with the ongoing positioning measurements and measurement data resulting from continuation of the ongoing positioning measurements after the handover.

The proposed technology enables continuation of ongoing positioning measurements at handover.

By ensuring measurement continuity the risk of losing previously accumulated measurement data and/or delaying the measurement results is eliminated or at least reduced.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
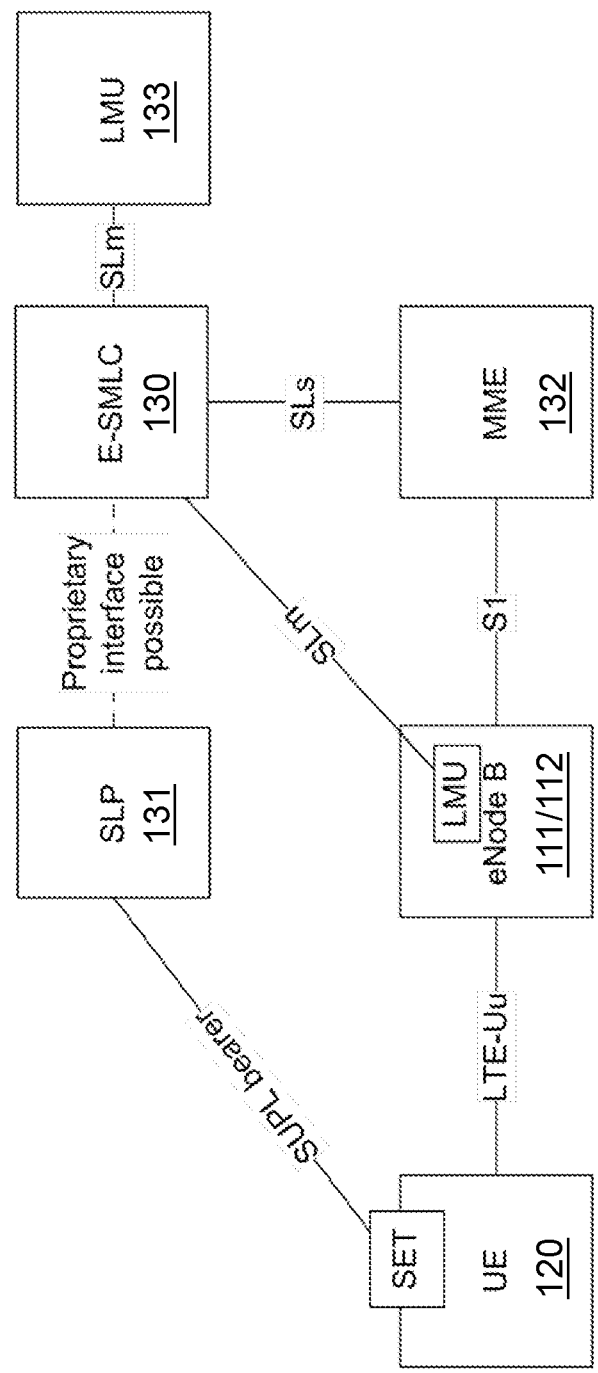
FIG. 1 is a schematic diagram illustrating an example of a UE positioning architecture in the particular example context of E-UTRAN.

Throughout the drawings, the same reference designations are used for similar or corresponding elements.

The following terminology is used in the embodiments herein:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, Remote Radio Unit, RRU, Remote Radio Head, RRH, nodes in Distributed Antenna Systems (DAS) etc. In particular, the term "base station" may encompass any type of radio base station.

Network node: In some embodiments a more general term "network node" is used and it can correspond to any type of radio network node or any network node, which communicates with at least a radio network node. Examples of network node are any radio network node stated above, core network node (e.g. Mobile Switching Center, MSC, Mobility management Entity, MME etc), Operation & Maintenance, O&M, Operations Support System, OSS, Self-Organizing Network, SON, nodes and positioning network nodes (e.g. E-SMLC), MDT nodes etc.

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, Personal Digital Assistant, PDA, iPAD, Tablet, mobile terminals, smart phone, Laptop Embedded Equipped (LEE), Laptop Mounted Equipment (LME), USB dongles and even sensor devices equipped with radio communication capabilities or the like.

The embodiments herein also applies to multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including Wideband Code Division Multiple Access, WCDMA, WiMax, Ultra Mobile Broadband, UMB and Global System for Mobile communications, GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

For a better understanding of the proposed technology it may be useful to begin with a brief overview and inventive analysis of the current situation in the prior art.

According to current specifications, as disclosed in references [1], [2] and [7], an Enhanced Cell ID, E-CID, positioning measurement procedure is not interrupted, i.e. continued, due to handover only in two cases:

1) In case the measurement was initiated over LPPa AND in case of intra-eNB handover only, because the LPPa measurement context remains unchanged in the same eNB.

2) In case the measurement was initiated over LPP, i.e. between the UE and the E-SMLC, in all cases, because in this case the procedure is transparent to the eNB.

In either case, to ensure the measurement continuity, the target eNB needs to be also aware of the UE uplink transmission configuration (namely the Sounding Reference Signal, SRS, configuration).

The inventors have recognized that in all other cases (i.e. measurement initiated over LPPa AND inter-eNB handover), it is not possible according to prior art standard procedures to continue an ongoing positioning measurement seamlessly after handover. This is because the measurement context may be not available in the target eNB, the positioning session (involving the communication between E-SMCL and eNB) does not transfer to the target eNB, and the measurement result can therefore not reach E-SMLC after the Primary Cell, PCell, change. As a result, the measurement will have to be restarted, with the consequence of losing the previously accumulated data and/or of delaying the measurement result.

3GPP RAN4 has agreed that the UE performing an E-CID TX-RX positioning measurement, shall restart the measurement after a PCell change (i.e. after a handover), as discussed in references [8] and [9].

A partial analysis of the situation in reference [10] suggests transferring the measurement data directly from the UE to the target eNB over RRC, but this approach cannot work because:
1) The target eNB has no measurement context configured for that UE; and
2) The E-SMLC has no measurement context configured for the target eNB for that UE.

Another approach is to transfer the positioning measurement data from the source eNB to the target eNB at handover, in the RRC Context IE in the X2AP HANDOVER REQUEST message, as discussed in reference [3]. With respect to the previous approach, in this case the target eNB has more time to take whatever action is appropriate, because the RRC Context IE is signaled with the handover request instead of after the handover has completed successfully. However, this approach still suffers from the fact that the E-SMLC has no measurement context configured for the target eNB for that UE. The RRC Context IE is currently used for transferring UE context between eNBs at handover for mobility purposes.

Alternative approaches involving the MME appear even less attractive, because they involve coordinating multiple interfaces and procedures (S1, X2, and SLs) across even more nodes: their complexity is quite significant, but their benefit, especially considering core network latency, is uncertain.

In the current 3GPP standards, whenever an LPPa E-CID positioning measurement procedure is ongoing during handover to another eNB, there is no way to continue the positioning measurement seamlessly. According to the specifications, the source eNB signals a measurement failure before initiating handover, and the measurement is restarted in the target eNB after handover is completed.

It is therefore an object of embodiments herein to overcome, or at least alleviate, problems in the prior art, e.g. to provide improved handling regarding positioning measurements when handover occurs.

It may be useful to begin with an overview of the overall signaling related to a few example embodiments before describing the actions and/or functions of the individual nodes involved in the overall positioning procedures.

In the following, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

In these non-limiting example embodiments, the proposed technology is described with reference the specific example of E-CID positioning measurements, but it should be understood that the invention is not limited thereto.

In the below examples, the handover is an inter-eNB handover, and the positioning protocol used for the ongoing positioning measurements is based on LTE Positioning Protocol annex, LPPa. The proposed technology is however not limited thereto.

Figure 2:
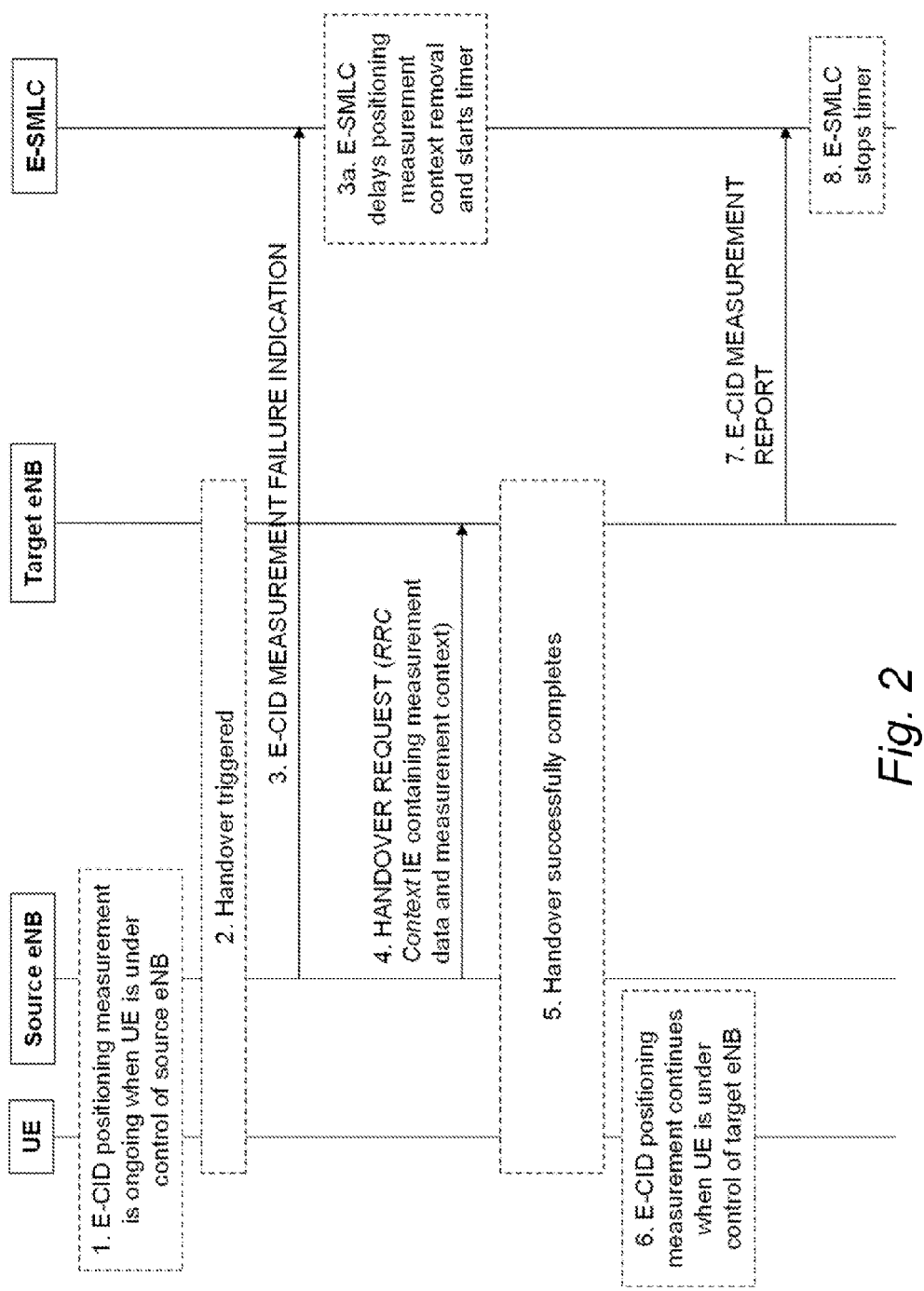
FIG. 2 is a schematic signaling diagram illustrating an example of the signaling flow according to a first embodiment.

FIG. 2 shows a signaling flow for an exemplary first embodiment.

A handover of the target UE for which an E-CID measurement is ongoing (Steps 1 and 2).

In Step 3, a positioning network node such as E-SMLC determines that handover has occurred, will occur or may occur, delays removal of the corresponding measurement context and expects receiving a measurement report from a target eNB. The delay time may be pre-defined or configurable. The determining may be, e.g., upon any one or more of:
receiving a measurement failure message (a general or of a specific type) from the source eNB,
receiving from another node (e.g., eNB, MME, or UE) an explicit indication or implicit indication (e.g., a new cell ID) that handover may occur, will occur or has occurred,
determining that a requested measurement report has not been received within a certain time.

For example, the source eNB sends to the E-SMLC an E-CID MEASUREMENT FAILURE INDICATION message, to signal that it cannot report the previously requested E-CID measurement. The message may contain one or more identifiers that identify the measurement or the measurement session; for example, it may include the E-SMLC UE Measurement ID IE and/or the eNB UE Measurement ID IE (according to the current standard, these two IDs can together uniquely identify the measurement in object). The message may optionally also include an indication of the failure cause, e.g., an appropriate value in the Cause IE according to reference [2]. Upon reception of the message (Step 3a), the E-SMLC delays the removal of the measurement context and starts a timer.

In Steps 4-5, the handover of the UE from the source eNB and the target eNB takes place. In Step 4, the source eNB sends to the target eNB the HANDOVER REQUEST message which includes the RRC Context IE as defined in [3], but extended with additional measurement context information. In the RRC Context IE, besides the RRC Handover Preparation Information message as defined in [4], the source eNB may also include an identity for identifying the positioning measurement, the positioning session or transaction associated with the positioning measurement. For example, the message may include one or more of: the LPPa Transaction ID it would use in a subsequent measurement report, the E-SMLC UE Measurement ID and the eNB UE Measurement ID that it had signaled to the E-SMLC in the E-CID MEASUREMENT FAILURE. According to the proposed technology, the RRC Handover Preparation Information message may also include the SRS configuration or similar measurement configuration to continue measurement in the target cell.

An example of a novel RRC Context IE is shown in Table 2 below.

TABLE 2

RRC Context IE signaled by the source eNB to the target eNB.

| IE/Group Name | Presence | Range | IE type and reference | Semantics description |
|---|---|---|---|---|
| RRC Handover Preparation Information | M | | OCTET STRING | RRC Handover Preparation Information message as defined in sub-clause 10.2.2 of [4] (including the SRS configuration to continue measurement in the target cell). |
| LPPa Transaction ID | O | | INTEGER(0 . . . 32767) | |
| E-SMLC UE Measurement ID | O | | INTEGER(1 . . . 15, . . . ) | |
| eNB UE Measurement ID | O | | INTEGER(1 . . . 15, . . . ) | |

This can be compared to the original RRC Context IE presented in reference [3].

| IE/Group Name | Presence | Range | IE type and reference | Semantics description |
|---|---|---|---|---|
| RRC Context | M | | OCTET STRING | RRC Handover Preparation Information message as defined in sub-clause 10.2.2 of [4] |

After handover has successfully completed (step 5), the UE and/or eNB continues/restarts in step 6 the measurement in the target cell according to reference [8] and, if performed by the UE, signals the results to the target eNB over RRC. It may be noted that the term "restarts" may be considered as from the UEs perspective, while the measurements from the E-SMLC perspective are rather continued. The term "restarts" comes from the wording used in reference [9].

In Step 7, the target eNB provides the measurement data to the E-SMLC in the E-CID MEASUREMENT REPORT as defined in reference [2]. According to the proposed technology, this report may now also include the E-SMLC UE Measurement ID and eNB UE Measurement ID IEs received from the source eNB in Step 4.

If the E-SMLC does not receive the E-CID MEASUREMENT REPORT message before the extended/delayed timer expires (Step 8), it finally removes the measurement context. The E-SMLC replies with an ERROR INDICATION message [2] if it receives the E-CID MEASUREMENT REPORT message after the timer expires; in this way, the target eNB knows that the reporting was not successful and can also remove its internal measurement context.

Figure 3:
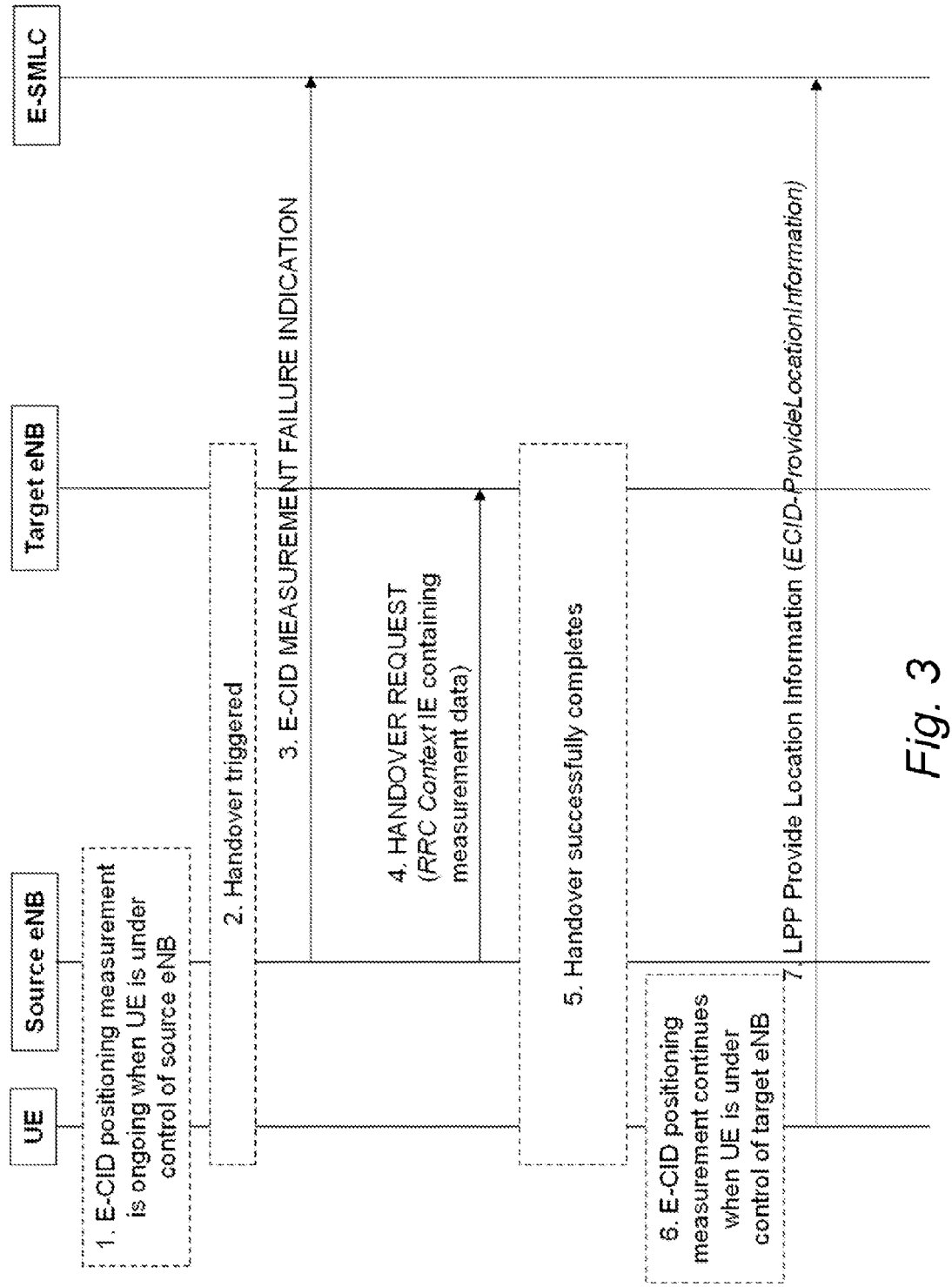
FIG. 3 is a schematic signaling diagram illustrating an example of the signaling flow according to a second embodiment.

FIG. 3 shows a signaling flow for a second embodiment.

The steps may be similar to the first embodiment, with the following differences.

In Step 4, the source eNB sends to the target eNB the HANDOVER REQUEST message which includes the RRC Context IE as defined in [3], but extended with a measurement configuration to enable continuation of the positioning measurements in the target cell. In the RRC Context IE, the source eNB may for example include inside the RRC Handover Preparation Information message as defined in [4], the SRS configuration to continue measurement in the target cell.

After handover has successfully completed, the UE continues/restarts in step 6 the measurement in the target cell according to [8] without signaling the results to the target eNB over RRC.

In Step 7, the UE provides the measurement data to the positioning network node such as the E-SMLC, e.g. in the LPP Provide Location Information message (ECID-ProvideLocationInformation). More information on the LPP Provide Location Information message can be found in references [1] and [7].

In a sense, the second example embodiment may be regarded as a hybrid LPPa-to-LPP positioning procedure.

Figure 4:
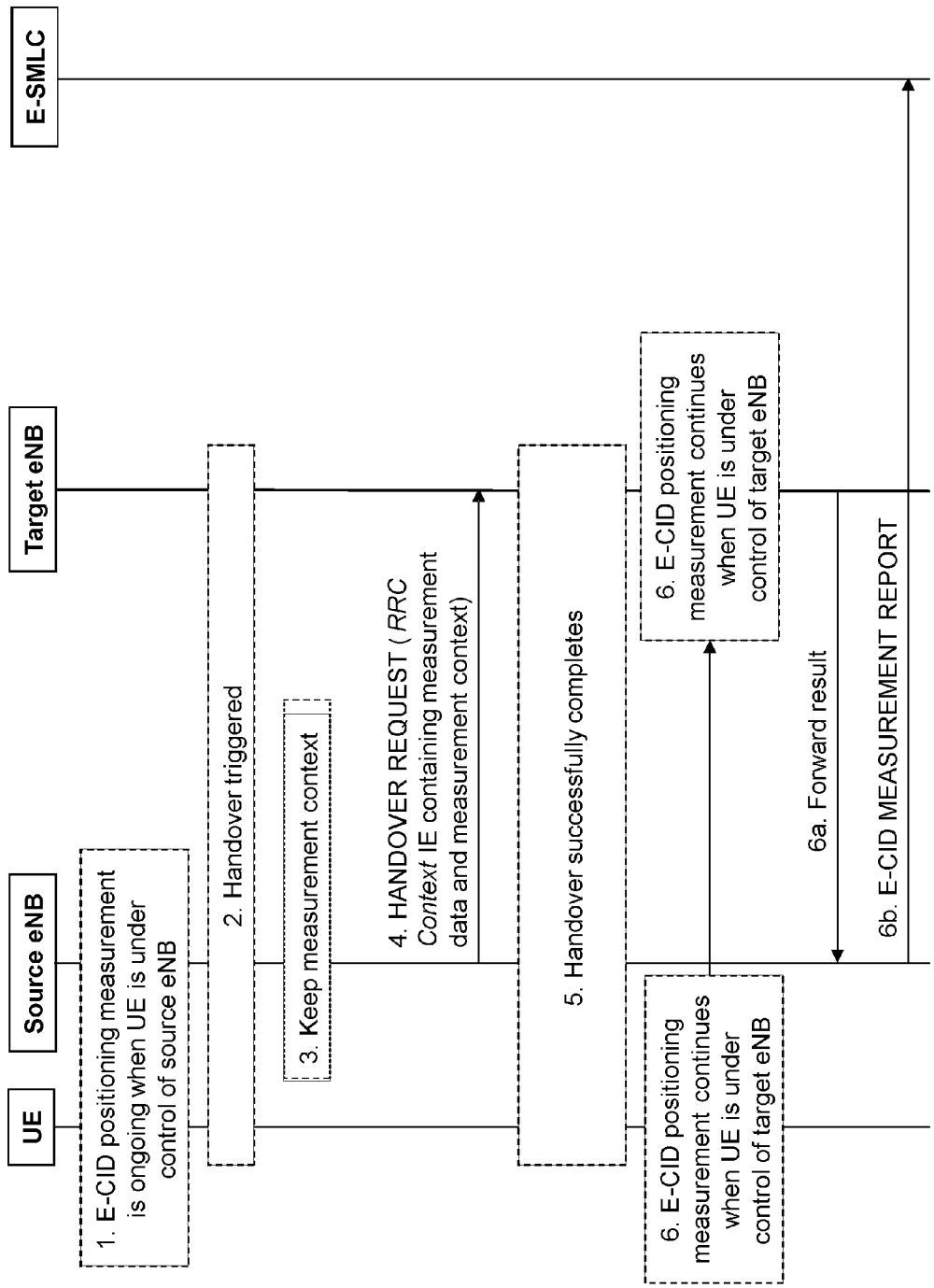
FIG. 4 is a schematic signaling diagram illustrating an example of the signaling flow according to a third embodiment.

FIG. 4 shows a signaling flow for a third embodiment.

In this embodiment, the target eNB receives the measurement report from the UE, forwards it to the source eNB, and the source eNB then sends the measurement report to the E-SMLC using the existing LPPa session.

This embodiment is also conceptually similar to the first embodiment, except that:

In Step 3, the source eNB does not send an E-CID FAILURE INDICATION message to the E-SMLC and keeps the positioning measurement context for the specific measurement.

There is no Step 3*a*.

Once the E-CID positioning measurement completes in the target cell (Step 6), the target eNB forwards the results to the source eNB over the X2 interface (Step 6*a*).

There is no Step 7.

The source eNB reports the measurement results to the E-SMLC using the E-CID MEASUREMENT REPORT message (Step 6*b*).

There is no Step 8.

As can be appreciated from these non-limiting examples, a feature of the proposed technology is to provide, handle and/or respond to contextual information such as a measurement context to enable and/or support continuation of ongoing positioning measurements at handover. By way of example, the measurement context may include a measurement configuration to continue the positioning measurements in the target cell, and/or a set of IDs identifying the positioning measurements related to the UE.

Applicability to Distributed eNB Implementations

Referring to the embodiments above, it is worth noting that the source and target eNBs could be realized as a "distributed" eNB, implemented over more than one digital unit (or multi-standard radio). In this case, the difference between intra-eNB and inter-eNB handover disappears. The signaling between the source and target eNBs and from them to the E-SMLC can be further optimized considering this implementation option.

Applicability to Other Positioning Methods

At least the first and third example embodiments above can also be realized when the positioning method used is UTDOA (a.k.a. uplink) positioning rather than E-CID positioning, since the signaling flow is conceptually the same for both positioning methods.

Embodiments discussed above have one or more of the following advantages:
1) By avoiding to fail the measurement during handover, it is possible to continue the measurement seamlessly from the source cell to the target cell also if they belong to different eNBs, providing the measurement results in less time;
2) There is no need to wait for the E-SMLC to restart the measurement in the target cell;
3) The measurement data already collected by the UE is not discarded, but reported to the E-SMLC for improved positioning accuracy.

Moreover, the second embodiment does not require changes in the behavior of either the eNB or the E-SMLC. Changes are only required in the UE in order to signal the measurement results using LPP after handover (directly to the E-SMLC) instead of using LPPa.

It is worth noticing that some measurements, including UE Rx-Tx time difference, may be used also for Minimization of Drive Tests, MDT. MDT measurements may be collected over a long time, so the embodiments described herein may also be important for MDT. MDT measurements are normally configured by eNB via RRC.

In the following, the proposed technology will be described with reference to non-limiting examples, mainly from the perspective of the individual nodes.

These embodiments are methods and arrangements that respectively are for enabling positioning measurements, for example such measurements that are based on cell identity, such as what commonly is referred to by Cell ID positioning method as mentioned above, and that were ongoing when a handover begun, to continue after the handover has completed.

Figure 5:
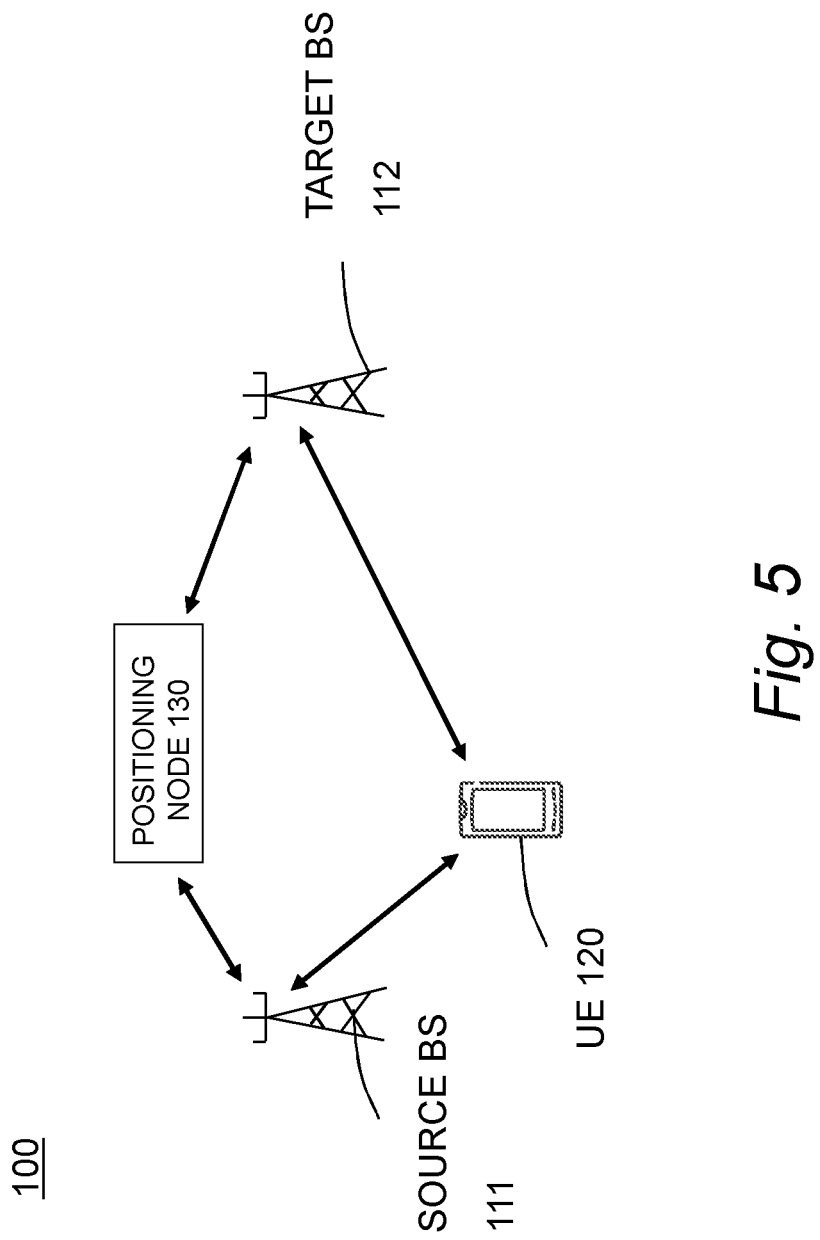
FIG. 5 is a schematic diagram illustrating an example of a wireless communications network.

FIG. 5 is a schematic diagram illustrating an example of a wireless communications network 100 in which embodiments herein may be implemented. For example, the wireless communications network 100 may be a wireless communication network such as an LTE, WCDMA, GSM network, any 3GPP cellular network, Wimax, or any cellular network or system.

The wireless communications network 100 comprises a plurality of network nodes whereof two, a first network node 111 and a second network node 112 are depicted in FIG. 5. The first network node 111 and the second network node 112 may each be a transmission point such as a radio base station, for example an eNB, an eNodeB, or an Home Node B, an Home eNode B or any other network node capable to serve a user equipment or a machine type communication device in a wireless communications network.

A wireless device 120 also referred to as a user equipment or UE is located in the wireless communication network 100. The wireless device 120 may e.g. be a user equipment, a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any direct user.

The wireless communications network 100 may further comprise a third network node 130 as depicted in FIG. 5. The third network node may be comprised in a core network of the wireless communications network. It may communicate with the UE although physically this may take part via the first network node 111 and/or second network node 112.

The handover is typically a handover of a UE, as illustrated in the example of FIG. 5, e.g. the UE 120, from a source network node, e.g. source base station (source BS) (which also may be known as source eNB), e.g. the first network node 111, to a target network node, e.g. target base station (target BS) (which also may be known as target eNB), e.g. the second network node 112. The position measurements are typically for determining a position of the UE.

Figure 6:
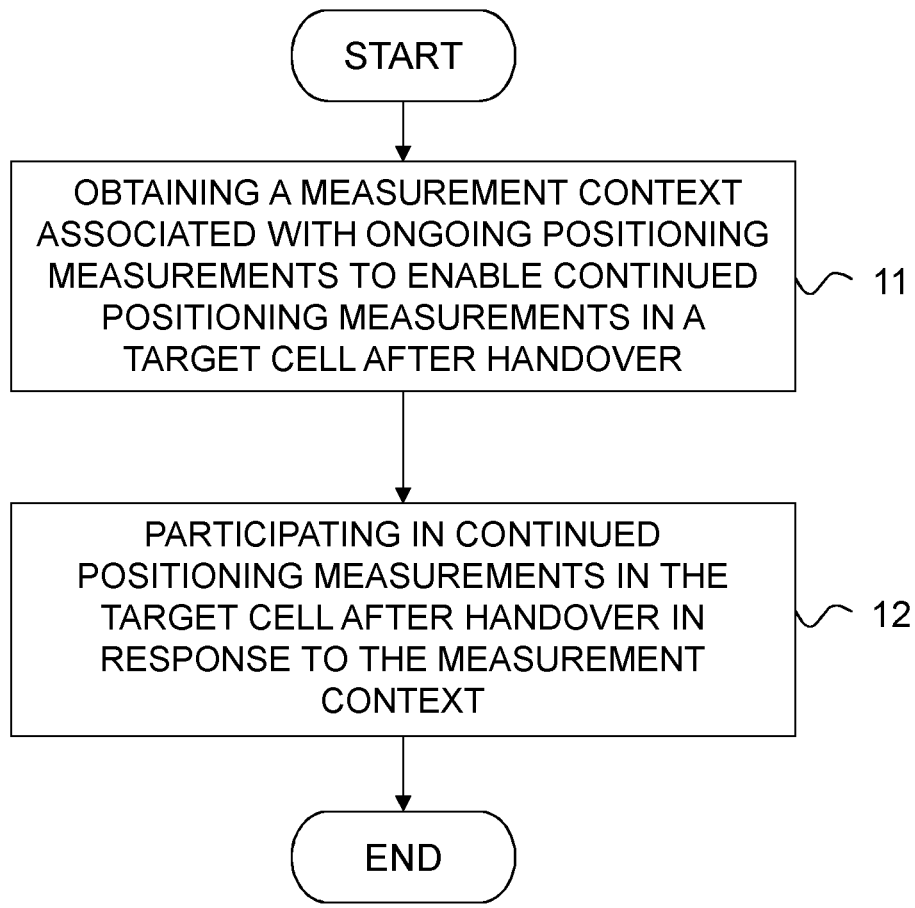
FIG. 6 is a schematic flow diagram illustrating an example of a method for enabling continuation of ongoing positioning measurements according to a first aspect.

FIG. 6 is a schematic flow diagram illustrating an example of a method for enabling continuation of ongoing positioning measurements according to a first aspect.

The method exemplified in FIG. 6 enables continuation of ongoing positioning measurements for a User Equipment, UE, 120 at handover from a source base station 111 to a separate target base station 112.

In this particular example, the method comprises the following steps:

Step 11 involves obtaining a measurement context associated with the ongoing positioning measurements to enable continued positioning measurements in a target cell of the target base station after the handover has been completed.

Step 12 involves participating in continued positioning measurements in the target cell after the handover in response to the measurement context.

Reference can also be made to the example embodiment schematically illustrated in FIG. 17, which will be described in more detail later on.

By way of example, the step of obtaining a measurement context comprises the step of the target base station 112 receiving a message from the source base station 111, which message comprises the measurement context associated with ongoing positioning measurements associated with the UE and the source base station, and the step of participating in continued positioning measurements is performed by at least the target base station 112 in response to the received message and after the handover when the UE is served by the target base station.

Optionally, the method further comprises the step of the target base station 112 sending a report to a positioning network node 130 comprising the measurement context associated with the ongoing positioning measurements and measurement data resulting from continuation of the ongoing positioning measurements after the handover.

The method may, as an alternative or a complement, include the optional step of the target base station 112 sending a report to the source base station 111 comprising measurement data resulting from continuation of the ongoing positioning measurements after the handover.

By way of example, the measurement context provides the target base station 112 with the information needed to identify measurement data as belonging to the same measurement session as before the handover.

Figure 7:
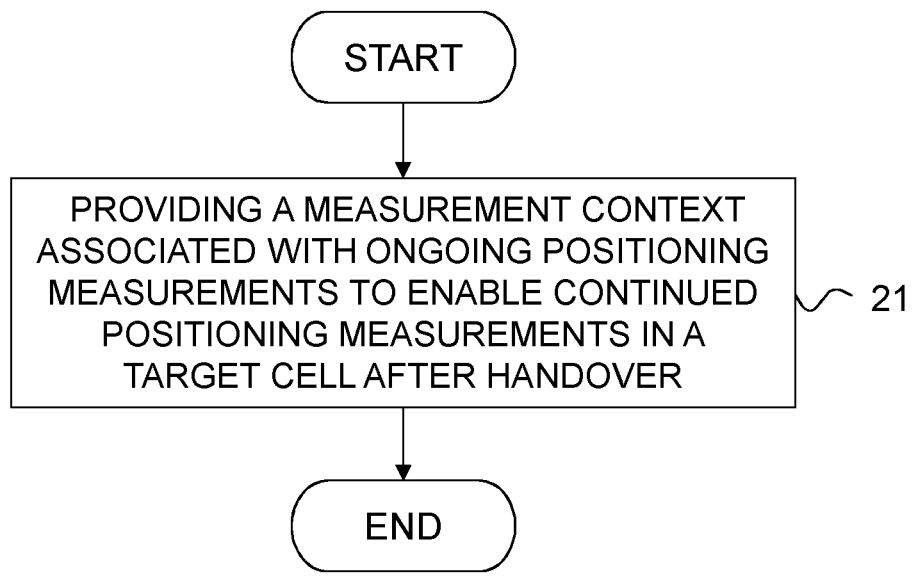
FIG. 7 is a schematic flow diagram illustrating an example of a method for enabling continuation of ongoing positioning measurements according to a second aspect.

FIG. 7 is a schematic flow diagram illustrating an example of a method for enabling continuation of ongoing positioning measurements according to a second aspect.

The method exemplified in FIG. 7 enables continuation of ongoing positioning measurements for a User Equipment, UE, 120 at handover from a source base station 111 to a separate target base station 112. In this particular example, the method comprises the step 21 of providing a measurement context associated with the ongoing positioning measurements to enable continued positioning measurements in a target cell of the target base station after the handover has been completed.

Reference can also be made to the example embodiment schematically illustrated in FIG. 15, which will be described in more detail later on.

By way of example, the step of providing a measurement context comprises the step of the source base station 111 sending the measurement context associated with the ongoing positioning measurements to the target base station 112.

Optionally, the method further comprises the following steps:
  The source base station 111 receives a report from the target base station 112 comprising measurement data resulting from continuation of the ongoing positioning measurements after the handover.
  The source base station 111 sends a further report to a positioning network node 130 comprising the measurement context associated with the ongoing positioning measurements and measurement data resulting from continuation of the ongoing positioning measurements after the handover.

The method may, as an alternative or a complement, include the optional step of the source base station 111 sending, in response to failure of continuing the ongoing positioning measurements associated with the UE 120 and the source base station 111 owing to handover, a failure indication to a positioning network node.

By way of example, the measurement context is included in a HANDOVER REQUEST comprising a RRC Context IE into which the measurement context is incorporated.

Figure 8:
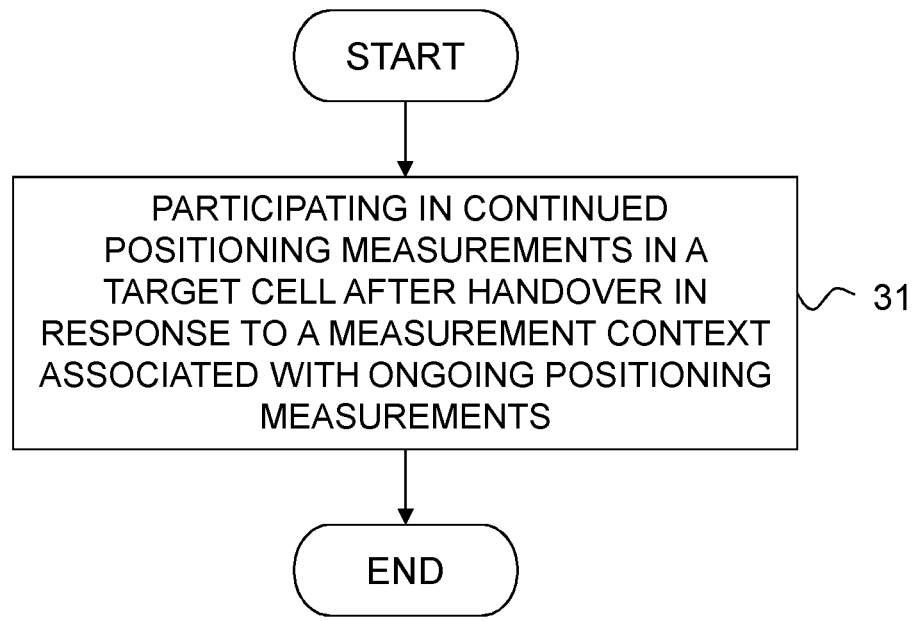
FIG. 8 is a schematic flow diagram illustrating an example of a method for enabling continuation of ongoing positioning measurements according to a third aspect.

FIG. 8 is a schematic flow diagram illustrating an example of a method for enabling continuation of ongoing positioning measurements according to a third aspect.

The method exemplified in FIG. 8 enables continuation of ongoing positioning measurements for a User Equipment, UE, 120 at handover from a source base station 111 to a separate target base station 112. In this particular example, the method comprises the step 31 of participating in continued positioning measurements in a target cell of the target base station 112 after the handover in response to a measurement context associated with the ongoing positioning measurement.

Reference can also be made to the example embodiment schematically illustrated in FIG. 13, which will be described in more detail later on.

By way of example, the step of participating in continued positioning measurements in a target cell in response to a measurement context may be performed by at least one of the UE 120 and the target base station 112. See also step 12 of the flow diagram of FIG. 6.

Optionally, the method further comprises the step of the UE 120 sending a report to a positioning network node 130 comprising the measurement context associated with the ongoing positioning measurements and measurement data resulting from continuation of the ongoing positioning measurements after the handover.

By way of example, the report may be sent from the UE 120 to an Enhanced Serving Mobile Location Center, E-SMLC, 130 over the LTE Positioning Protocol, LPP.

Figure 9:
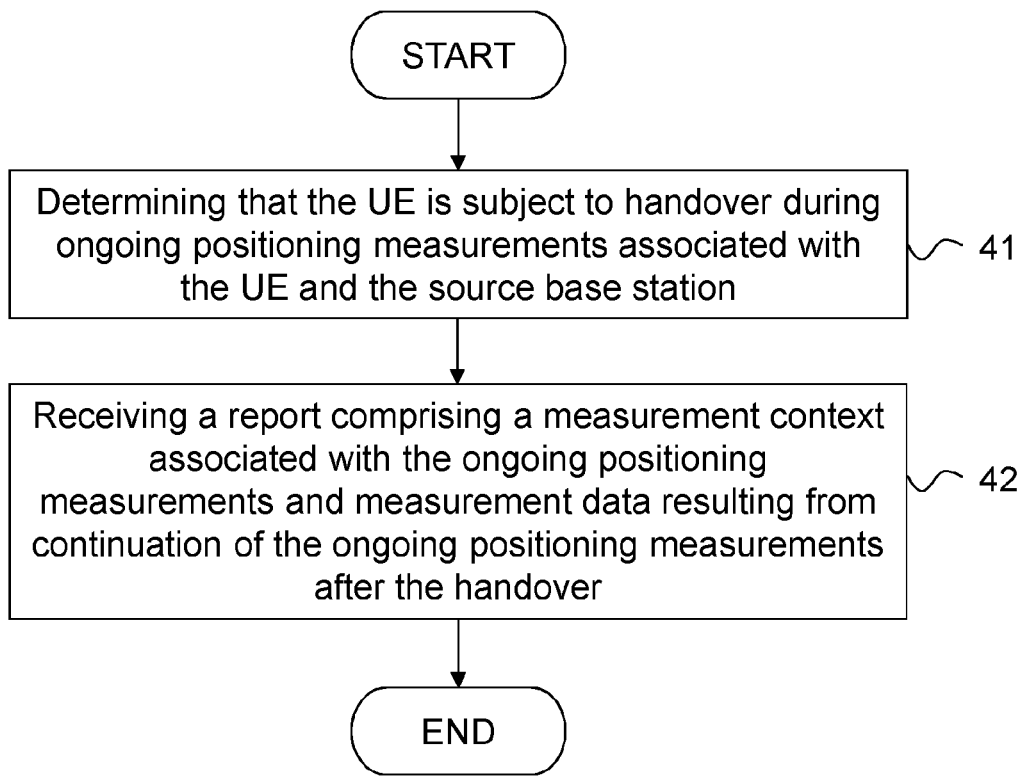
FIG. 9 is a schematic flow diagram illustrating an example of a method for enabling continuation of ongoing positioning measurements according to a fourth aspect.

FIG. 9 is a schematic flow diagram illustrating an example of a method for enabling continuation of ongoing positioning measurements according to a fourth aspect.

The method exemplified in FIG. 9 enables continuation of ongoing positioning measurements for a User Equipment, UE, 120 at handover from a source base station 111 to a separate target base station 112.

In this particular example, the method comprises the following steps:
  Step 41 involves determining that the UE is subject to handover during the ongoing positioning measurements associated with the UE 120 and the source base station 111.
  Step 42 involves receiving a report comprising a measurement context associated with the ongoing positioning measurements and measurement data resulting from continuation of the ongoing positioning measurements after the handover.

Reference can also be made to the example embodiments schematically illustrated in FIG. 10 and FIG. 11, which will be described in more detail later on.

By way of example, the step of determining that the UE 120 is subject to handover and the step of receiving a report are performed by a positioning network node 130.

Optionally, the method further comprises the step of the positioning network node delaying removing of a measurement context and expecting to receive the report from the target base station.

By way of example, the step of determining that the UE is subject to handover is based on receiving a measurement failure message from the source base station indicating failure of continuing the ongoing positioning measurements associated with the UE and the source base station, or based on receiving an indication that handover may occur, will occur or has occurred, or based on determining that a requested measurement report has not been received within a certain time.

As an example, for the example embodiments disclosed herein, the measurement context may include at least one of:
  a measurement configuration to continue the positioning measurements in the target cell; and
  a set of IDs identifying the positioning measurements for the UE.

For example, the measurement configuration may be a Sounding Reference Signal, SRS, configuration and the set of IDs may include an Enhanced Serving Mobile Location Center, E-SMLC, UE Measurement ID and an eNB UE measurement ID and an optional LTE Positioning Protocol annex, LPPa, Transaction ID.

As previously indicated, the handover may be, e.g. an inter-eNB handover, and the positioning protocol used for the ongoing positioning measurements may be, e.g. the LTE Positioning Protocol annex, LPPa.

By way of example, the positioning method may be based on Enhanced Cell ID, E-CID, or Uplink Time Difference of Arrival, UTDOA.

In the following, a number of complementary and/or alternative non-limiting examples will be described. Several embodiments are comprised herein.

Upon determining that handover (herewith "handover" is used interchangeably with "PCell change") may occur or has occurred, the positioning network node such as the E-SMLC delays removing the corresponding measurement context and expects to receive the positioning measurement data from a target eNB. The target eNB reports the positioning measurement data (including the context) to the E-SMLC, e.g. by initiating an appropriate Class 2 LPPa procedure. The determining may be, e.g., upon any one or more of:
  Receiving a measurement failure message (a general or of a specific type) from the source eNB, Receiving from another node (e.g., eNB, MME, or UE) an explicit indication or implicit indication (e.g., a new cell ID) that handover may occur, will occur or has occurred, Determining that a requested measurement report has not been received within a certain time.

In other embodiments, the target eNB receives the measurement configuration such as a SRS configuration for the measurement from the source eNB during handover (e.g., via X2) and configures SRS in the target cell based on the received SRS configuration (the new SRS configuration may be the same or different from the received SRS configuration). After handover is complete, the UE provides its measurement data directly to the positioning network node such as the E-SMLC using, e.g. LPP.

Figure 10:
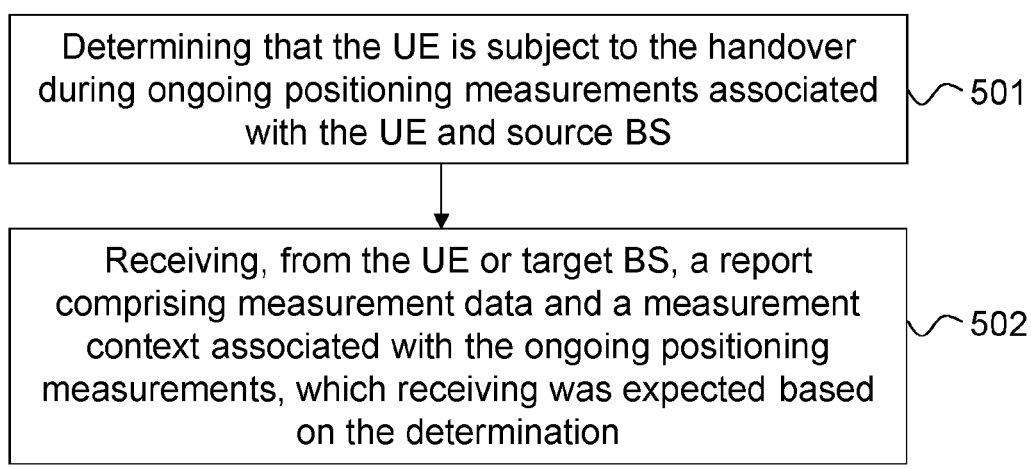
FIG. 10 is a schematic flow diagram illustrating an alternative example of a method for enabling continuation of ongoing positioning measurements according to the fourth aspect.

FIG. 10 is a schematic flow diagram illustrating an alternative example of a method for enabling continuation of ongoing positioning measurements according to the fourth aspect. According to this example, a method in a network node, such as the network node 130 that e.g. is a positioning network node (which also may be known as E-SMLC), comprises the actions of:

Determining 501 that the UE is subject to the handover during ongoing positioning measurements associated with the UE and source BS. This action may fully or partly correspond to the action 3 in FIGS. 2 and 3. This action may be performed by a determining circuitry within the positioning network node.

Receiving 502, from the UE or target BS, a report comprising measurement data and a measurement context associated with the ongoing positioning measurements, which receiving was expected based on the determination.

The measurement data are resulting from continuation of the ongoing positioning measurements after the handover when the UE was served by the target BS. The ongoing positioning measurement(s) was/were continued by the UE and/or the target BS in response to a message (which may be known as HANDOVER REQUEST) sent by the source BS and received by the target BS, which message comprised the measurement context associated with the ongoing positioning measurements. The message sent by the source BS to the target BS may partly or fully correspond to what is sent in action 4 in FIGS. 2 and 3. The present receiving action may fully or partly correspond to the action 7 in FIGS. 2 and 3. This action may be performed by a receiving circuitry within the positioning network node.

In some embodiments, it is determined that the UE is subject to the handover based on that an indication is received from the source BS, which indication indicates failure of continuing the ongoing positioning measurements associated with the UE and source BS.

The positioning network node may comprise an interface unit to facilitate communications between the positioning node and other nodes or devices, e.g., BSs and UEs. The interface may, for example, include a transceiver configured to transmit and receive radio signals over an air interface in accordance with a suitable standard.

Figure 11:
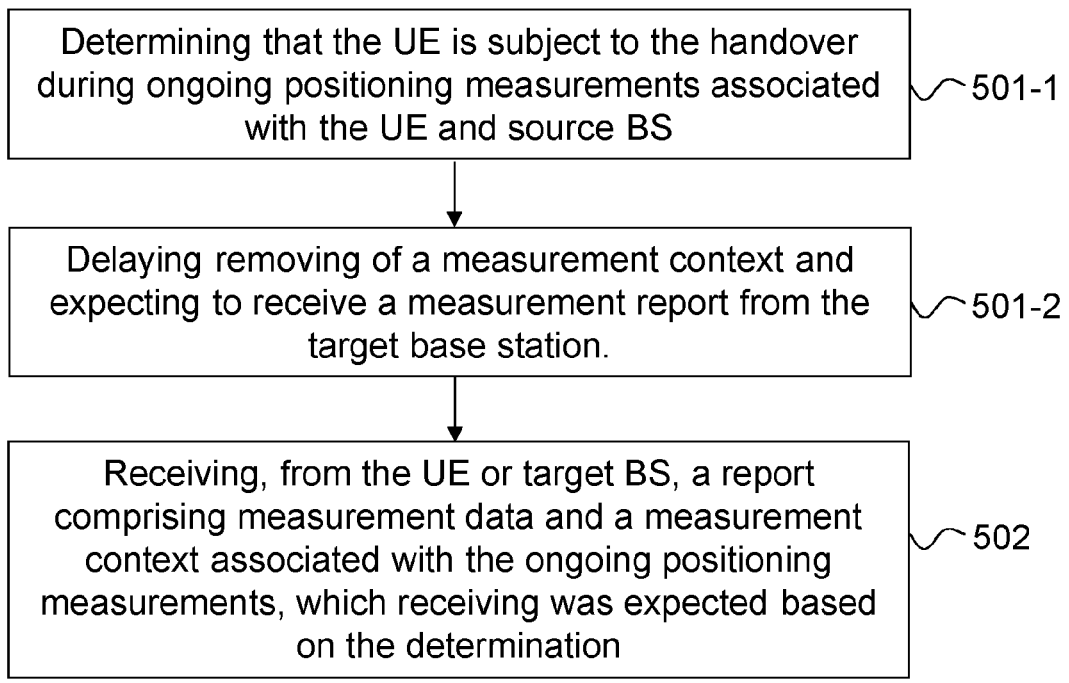
FIG. 11 is a schematic flow diagram illustrating another alternative example of a method for enabling continuation of ongoing positioning measurements according to the fourth aspect.

FIG. 11 is a schematic flow diagram illustrating another alternative example of a method for enabling continuation of ongoing positioning measurements according to the fourth aspect. In this example, action 501-1 in FIG. 11 corresponds to action 501 in FIG. 10, and action 502 in FIG. 11 corresponds to action 502 in FIG. 10. The method illustrated in FIG. 11 further comprises the action of delaying 501-2 removing of a measurement context and expecting to receive a measurement report from the target base station.

Figure 13:
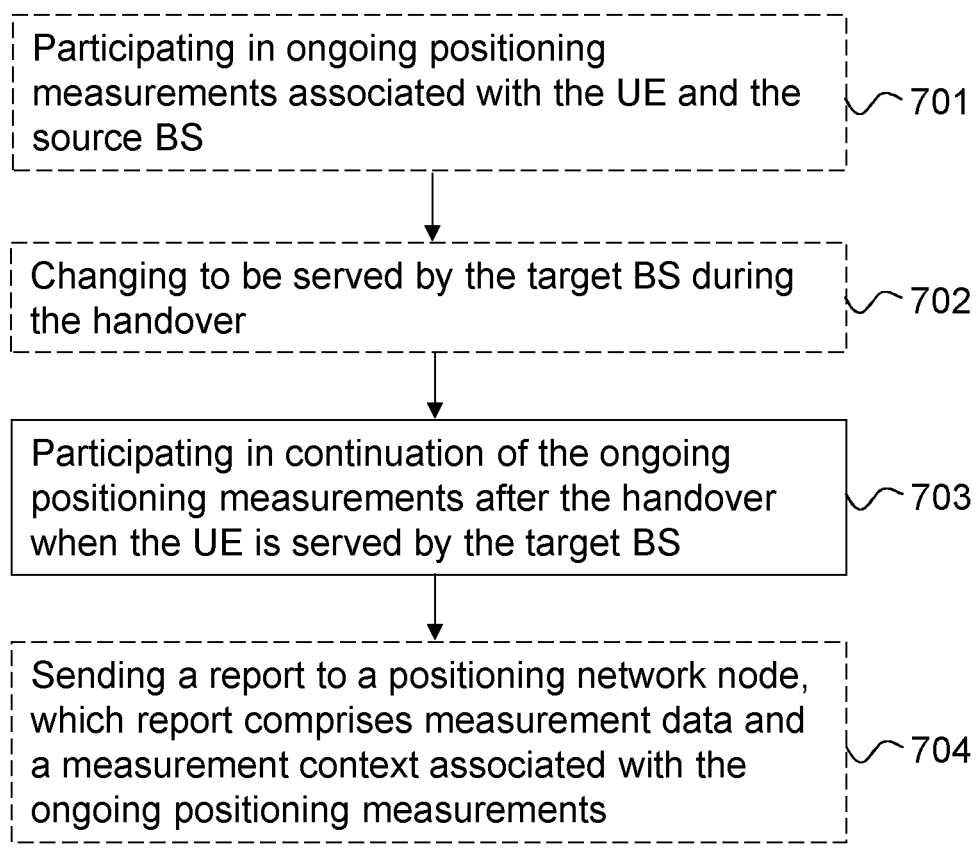
FIG. 13 is a schematic diagram illustrating an example of method actions performed by a UE according to some embodiments.

FIG. 13 is a schematic diagram illustrating an example of method actions performed by a UE according to some embodiments. According to this example, a method in the UE comprises the actions of:

Participating 701 in ongoing positioning measurements associated with the UE and the source BS. This action may fully or partly correspond to the action 1 in FIGS. 2 and 3. This action may be performed by a participating circuitry.

Changing 702 to be served by the target BS during the handover. This action may fully or partly correspond to the action 5 in FIGS. 2 and 3. This action may be performed by a changing circuitry.

Participating 703 in continuation of the ongoing positioning measurements after the handover when the UE is served by the target BS. The ongoing positioning measurements was continued by the UE and/or the target BS in response to a message (which may be known as HANDOVER REQUEST) sent by the source BS and received by the target BS, which message comprised a measurement context associated with the ongoing positioning measurements. The message sent by the source BS to the target BS may partly or fully correspond to what is sent in action 4 in FIGS. 2 and 3. The present participating action may fully or partly correspond to the action 6 in FIGS. 2 and 3. This action may be performed by the participating circuitry.

In some embodiments, the method further comprises the action of:

Sending 704 a report to a positioning network node, such as the positioning network node 130 (aka E-SMLC herein), which report comprises measurement data and a measurement context associated with the ongoing positioning measurements. The measurement data are resulting from the continuation of the ongoing positioning measurements. This action may fully or partly correspond to the action 7 in FIG. 3. This action may be performed by a sending circuitry.

The UE may comprise an interface unit to facilitate communications between the UE and other nodes or devices, e.g., BSs and UEs. The interface may, for example, include a transceiver configured to transmit and receive radio signals over an air interface in accordance with a suitable standard.

Figure 15:
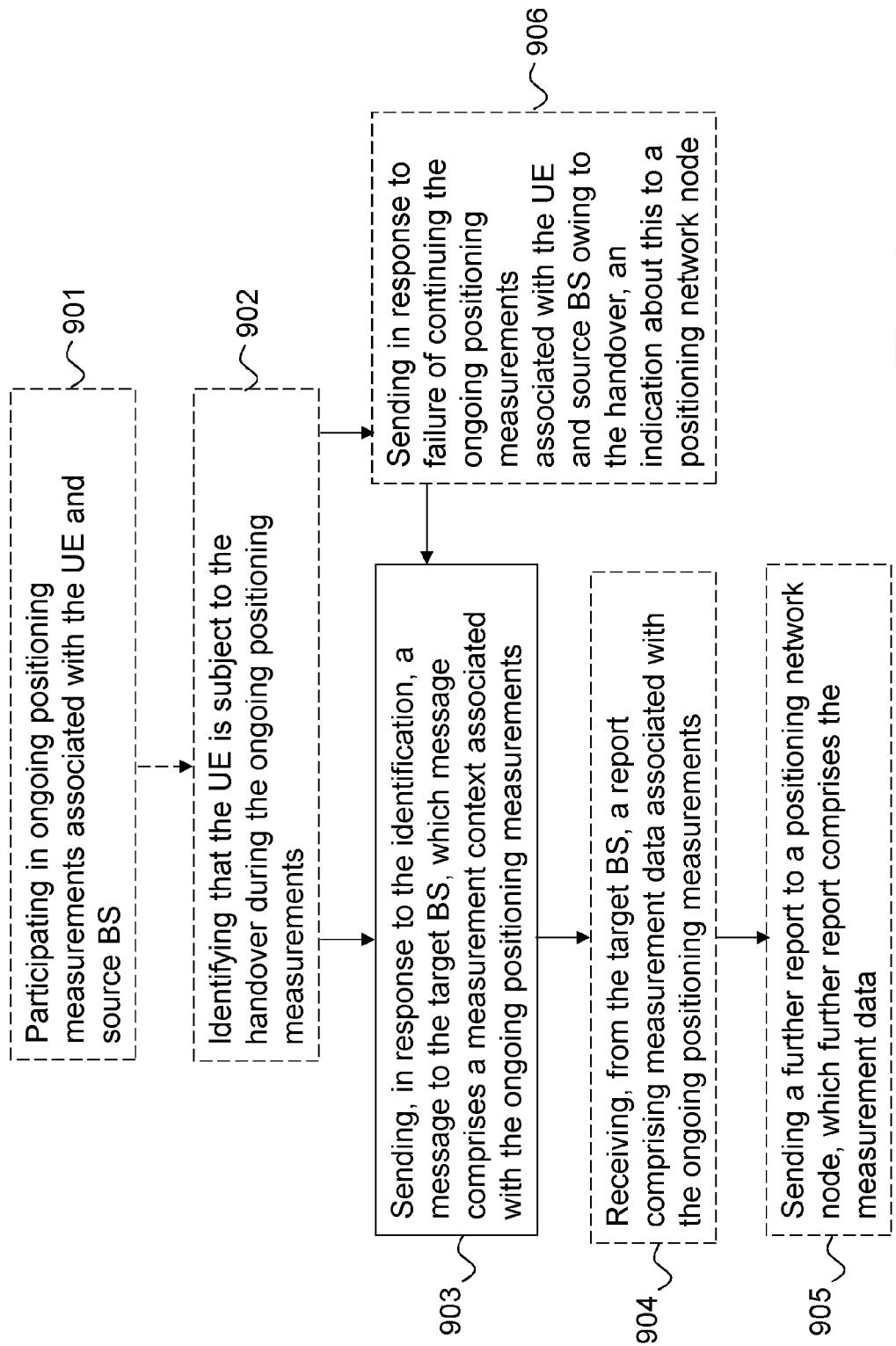
FIG. 15 is a schematic diagram illustrating an example of method actions performed by a source base station according to some embodiments.

FIG. 15 is a schematic diagram illustrating an example of method actions performed by a source base station according to some embodiments. According to this example, a method in the source BS comprises the actions of:

Participating 901 in ongoing positioning measurements associated with the UE and source BS. This action may fully or partly correspond to the action 1 in FIGS. 2 and 3. This action may be performed by a participating circuitry within the within the source BS.

Identifying 902 that the UE is subject to the handover during the ongoing positioning measurements. This action may fully or partly correspond to the action 2 in FIGS. 2 and 3. This action may be performed by an identifying circuitry within the source BS.

Sending 903, in response to the identification, a message (which may be known as HANDOVER REQUEST) to the target BS, which message comprises a measurement context associated with the ongoing positioning measurements. This action may fully or partly correspond to the action 4 in FIGS. 2 and 3. This action may be performed by a sending circuitry within the source BS.

In some embodiments, the method further comprises the action of:

Receiving 904, from the target BS, a report comprising measurement data associated with the ongoing positioning measurements. The measurement data are resulting from continuation of the ongoing positioning measurements after the handover when the UE was served by the target BS. The ongoing positioning measurements was continued by the UE and/or the target BS in response to the message sent by the source BS and received by the target BS, which message comprised the measurement context associated with the ongoing positioning measurements. The report may further comprise the measurement context. This action may fully or partly correspond to the action 6a in FIG. 4 from the perspective of the source base station. This action may be performed by a receiving circuitry within the source BS.

Sending 905 a further report to a positioning network node, such as the positioning network node 130 (aka E-SMLC herein), which further report comprises the measurement data. The further report may further comprise the measurement context. This action may fully or partly correspond to the action 6b in FIG. 4. This action may be performed by the sending circuitry within the source BS.

In some embodiments, the method further comprises the action of:

Sending 906, in response to failure of continuing the ongoing positioning measurements associated with the UE and source BS owing to the handover, an indication about this to a positioning network node, such as the positioning network node 130 (aka E-SMLC herein). This action may fully or partly correspond to the action 3 in FIGS. 2 and 3. This action may be performed by the sending circuitry within the source BS.

The source BS may comprise an interface unit to facilitate communications between the source BS and other nodes or devices, e.g., BSs and UEs. The interface may, for example, include a transceiver configured to transmit and receive radio signals over an air interface in accordance with a suitable standard.

Figure 17:
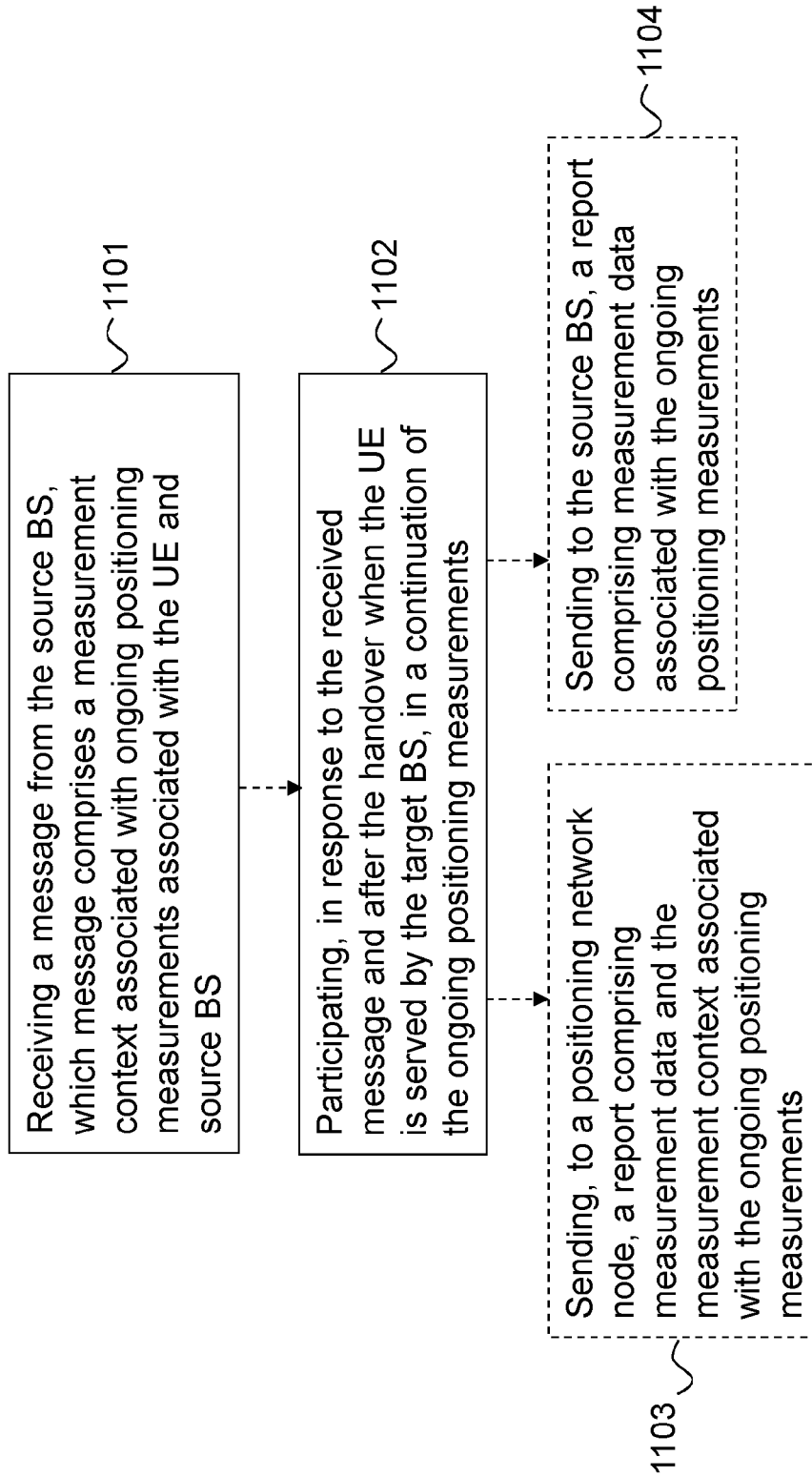
FIG. 17 is a schematic diagram illustrating an example of method actions performed by a target base station according to some embodiments.

FIG. 17 is a schematic diagram illustrating an example of method actions performed by a target base station according to some embodiments. According to this example, a method in the target BS comprises the actions of:

Receiving 1101 a message (which may be known as HANDOVER REQUEST) from the source BS, which message comprises a measurement context associated with ongoing positioning measurements associated with the UE and source BS. This action may fully or partly correspond to the action 4 in FIGS. 2 and 3. This action may be performed by a receiving circuitry within the target BS.

Participating 1102, in response to the received message and after the handover when the UE is served by the target BS, in a continuation of the ongoing positioning measurements. This action may fully or partly correspond to the action 6 in FIGS. 2 and 3 and 4. This action may be performed by a participating circuitry within the target BS.

In some embodiments, the method further comprises the action of:

Sending 1103, to a positioning network node, such as the positioning network node 130 (aka E-SMLC herein), a report comprising measurement data and the measurement context associated with the ongoing positioning measurements. The measurement data are resulting from the continuation of the ongoing positioning measurements. This action may fully or partly correspond to the action 7 in FIG. 2. This action may be performed by a sending circuitry within the target BS.

In some embodiments, the method further comprises the action of:

Sending 1104, to the source BS, a report comprising measurement data associated with the ongoing positioning measurements. The measurement data are resulting from the continuation of the ongoing positioning measurements. The report may further comprise the measurement context. This action may fully or partly correspond to the action 6a in FIG. 4 from the perspective of the target base station. This action may be performed by a sending circuitry within the target BS.

The target BS may comprise an interface unit to facilitate communications between the target BS and other nodes or devices, e.g., BSs and UEs. The interface may, for example, include a transceiver configured to transmit and receive radio signals over an air interface in accordance with a suitable standard.

Measurement context may herein generally refer to at least one identifier (ID) identifying measurement data associated with the ongoing position measurements so that any receiving node receiving the measurement context is enabled to identify the measurement data associated therewith as belonging together, i.e. to one and the same measurement session, and not mixing this data with measurement data pertaining any other measurement session of positing measurements.

The identifying should be unique in at least the sense of avoiding such mixing. For example, in LTE, measurement context may comprise an eNB measurement ID identifying the eNB involved in the measurement, an E-SMLC measurement ID identifying the E-SMLC involved in the measurements. Both these IDs are typically signaled over LPPa between the eNB and the E-SMLC together with the a LPPa Transaction ID. By way of example, a receiving node may uniquely identify the measurement session using the combination of the three IDs. More information on these IDs can be found, e.g. in references [1] and [2].

Embodiments herein may be seen as comprising a transfer of measurement context from the source BS to the target BS so that the target eNB has all the information it needs to identify, e.g. to the E-SMLC, the measurement data as belonging to the same session as before the handover.

Reference can also be made to [5, 6].

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

In the example of a computer implementation, at least some of the steps, functions, procedures, modules and/or blocks described herein are implemented in a computer program, which is loaded into a memory for execution by the processing circuitry such as one or more processors. The processing circuitry and memory are interconnected to each other to enable normal software execution. An optional input/output device may also be interconnected to the processing circuitry and/or the memory to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

The software or computer program may thus be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof.

For example, the computer program stored in memory includes instructions executable by the processing circuitry, whereby the processing circuitry is able or operative to execute the above-described steps, functions, procedure and/or blocks.

The computer or processing circuitry does not have to be dedicated to only execute the above-described steps, functions, procedures and/or blocks, but may also execute other tasks.

The embodiments herein may thus be implemented through one or more processors, such as a respective processor in the nodes and UE depicted in FIGS. 12, 14, 16 and 18, together with respective computer program code for performing the functions and actions of the embodiments herein. The program code mentioned above may also be provided as a respective computer program product, for instance in the form of a respective data carrier carrying computer program code for performing the embodiments herein when being loaded into the respective nodes and UE depicted in FIGS. 12, 14, 16 and 18. One such carrier may be in the form of a CD ROM disc. It is however feasible with other data carriers such as a memory stick. The respective computer program code may furthermore be provided as pure program code on a server and downloadable to the respective nodes and UE depicted in FIGS. 12, 14, 16 and 18.

The nodes and UE depicted in FIGS. 12, 14, 16 and 18, may respectively further comprise a respective memory comprising one or more memory units. The respective memory is arranged to be used to store obtained information, store data, configurations, scheduling, and applications and so forth to perform the methods herein when being executed in the respective nodes and UE depicted in FIGS. 12, 14, 16 and 18.

Positioning Network Node

According to an example embodiment, the positioning network node 130 is configured to enable continuation of ongoing positioning measurements for a User Equipment, UE, 120 at handover from a source base station 111 to a separate target base station 112. The positioning network node 130 is configured to determine that the UE 120 is subject to handover during the ongoing positioning measurements. The positioning network node 130 is also configured to receive a report comprising a measurement context associated with the ongoing positioning measurements and measurement data resulting from continuation of the ongoing positioning measurements after the handover.

By way of example, the positioning network node 130 may also be configured to delay removing of a measurement context and expecting to receive the report from the target base station 112.

Optionally, the positioning network node 130 may be configured to determine that the UE 120 is subject to handover based on receiving a measurement failure message from the source base station 111 indicating failure of continuing the ongoing positioning measurements associated with the UE 120 and the source base station 111, or based on receiving an indication that handover may occur, will occur or has occurred, or based on determining that a requested measurement report has not been received within a certain time.

Figure 12:
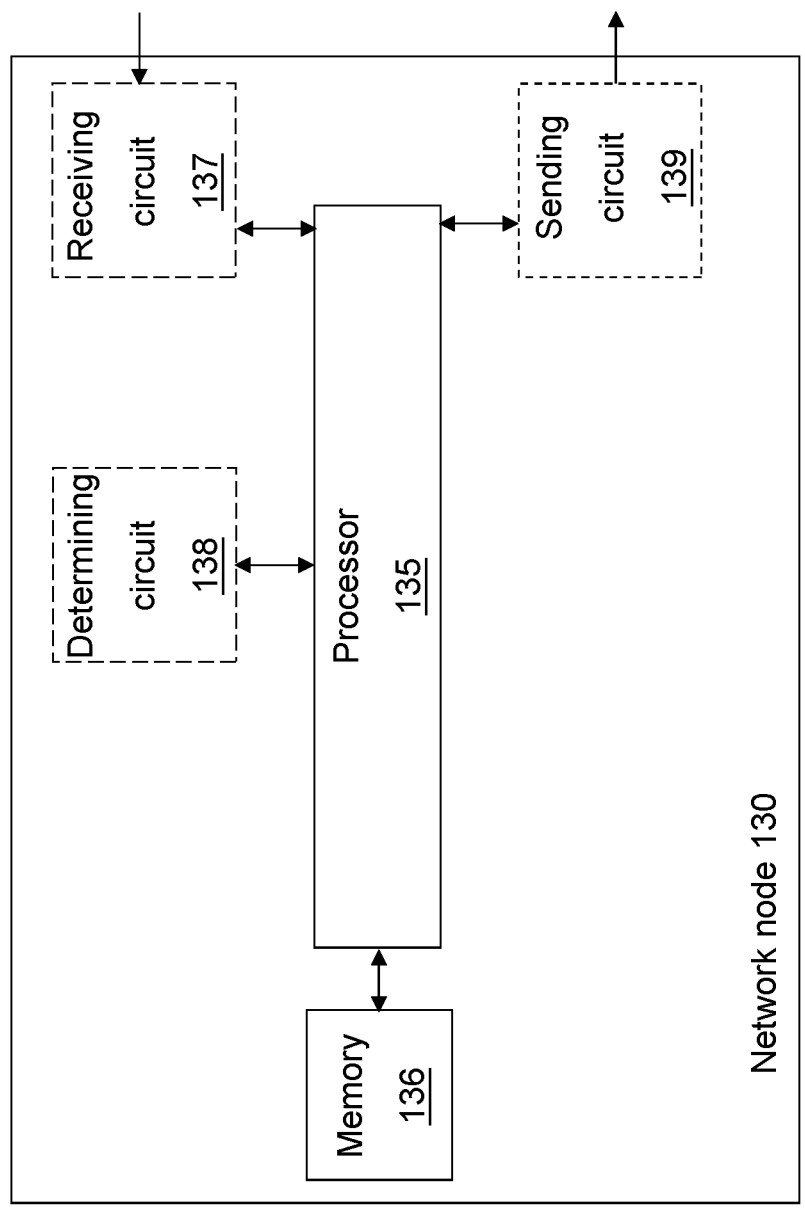
FIG. 12 is a schematic block diagram illustrating an example of a positioning network node according to an embodiment.

FIG. 12 is a schematic block diagram illustrating an example of a positioning network node according to an embodiment. The positioning network node 130 basically comprises a processor 135 and a memory 136, and optional specific circuits such as a receiving circuit 137, a determining circuit 138 and a sending circuit 139.

As indicated in the particular example of FIG. 12, the positioning network node 130 comprises a processor 135 and a memory 136, wherein the memory 136 comprises instructions executable by the processor 135 to perform operations of the positioning network node.

User Equipment, UE

According to an example embodiment, the UE 120 is configured to enable continuation of ongoing positioning measurements for the UE 120 at handover from a source base station 111 to a separate target base station 112. The UE 120 is configured to participate in continued positioning measurements in a target cell of the target base station after the handover in response to a measurement context associated with the ongoing positioning measurement.

By way of example, the UE 120 is configured to send a report to a positioning network node 130 comprising the measurement context associated with the ongoing positioning measurements and measurement data resulting from continuation of the ongoing positioning measurements after the handover.

Figure 14:
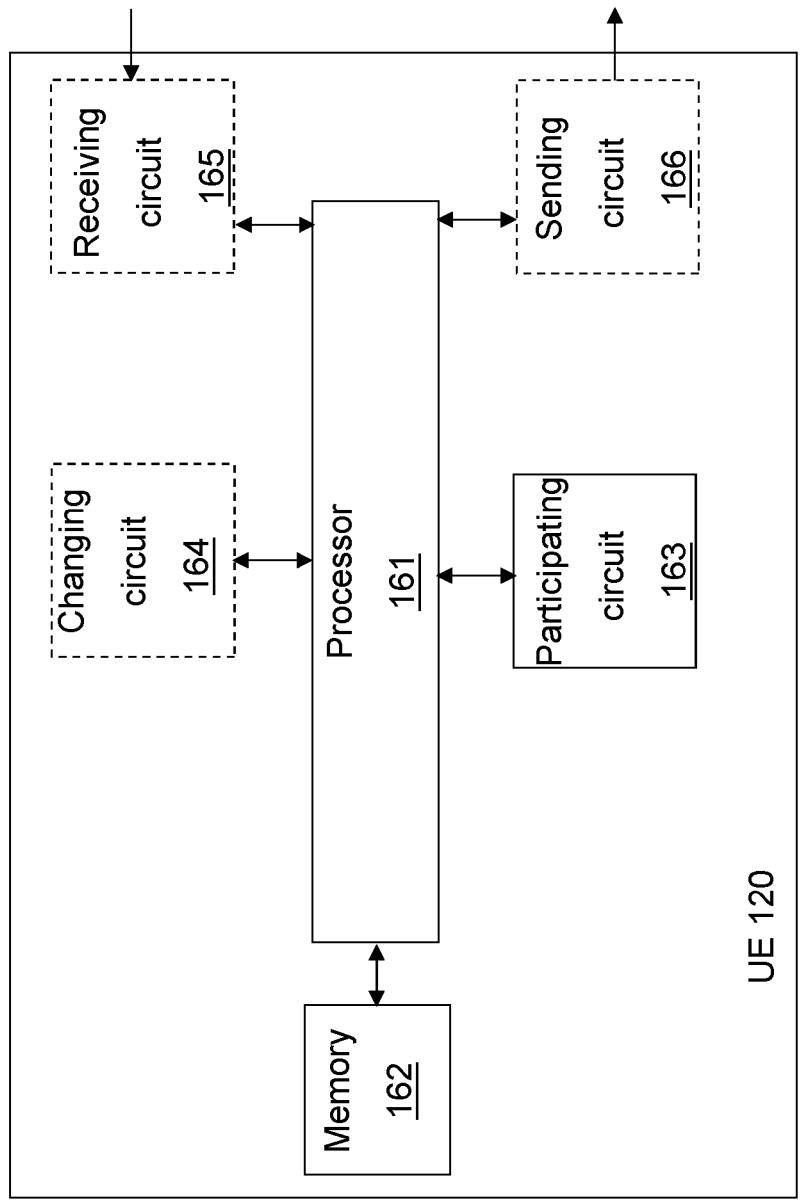
FIG. 14 is a schematic block diagram illustrating an example of a UE according to an embodiment.

FIG. 14 is a schematic block diagram illustrating an example of a UE according to an embodiment. The UE 120 basically comprises a processor 161, a memory 162, and optional circuits such as a participating circuit 163, a changing circuit 164, a receiving circuit 165, and a sending circuit 166.

As indicated in the particular example of FIG. 14, the UE 120 comprises a processor 161 and a memory 162, wherein the memory 162 comprises instructions executable by the processor 161 to perform operations of the UE.

Source Base Station

According to an example embodiment, the source base station 111 is configured to enable continuation of ongoing positioning measurements for a User Equipment, UE, 120 at handover to a target base station 112. The source base station 111 is configured to send a measurement context associated with the ongoing positioning measurements to the target base station to enable continued positioning measurements in a target cell of the target base station after the handover has been completed.

By way of example, the source base station 111 may be configured to send, in response to failure of continuing the ongoing positioning measurements associated with the UE and the source base station owing to handover, a failure indication to a positioning network node. The source base station 111 may be configured to receive a report from the target base station comprising measurement data resulting from continuation of the ongoing positioning measurements after the handover. The source base station 111 may be configured to send a further report to a positioning network node comprising the measurement context associated with the ongoing positioning measurements and measurement data resulting from continuation of the ongoing positioning measurements after the handover.

Figure 16:
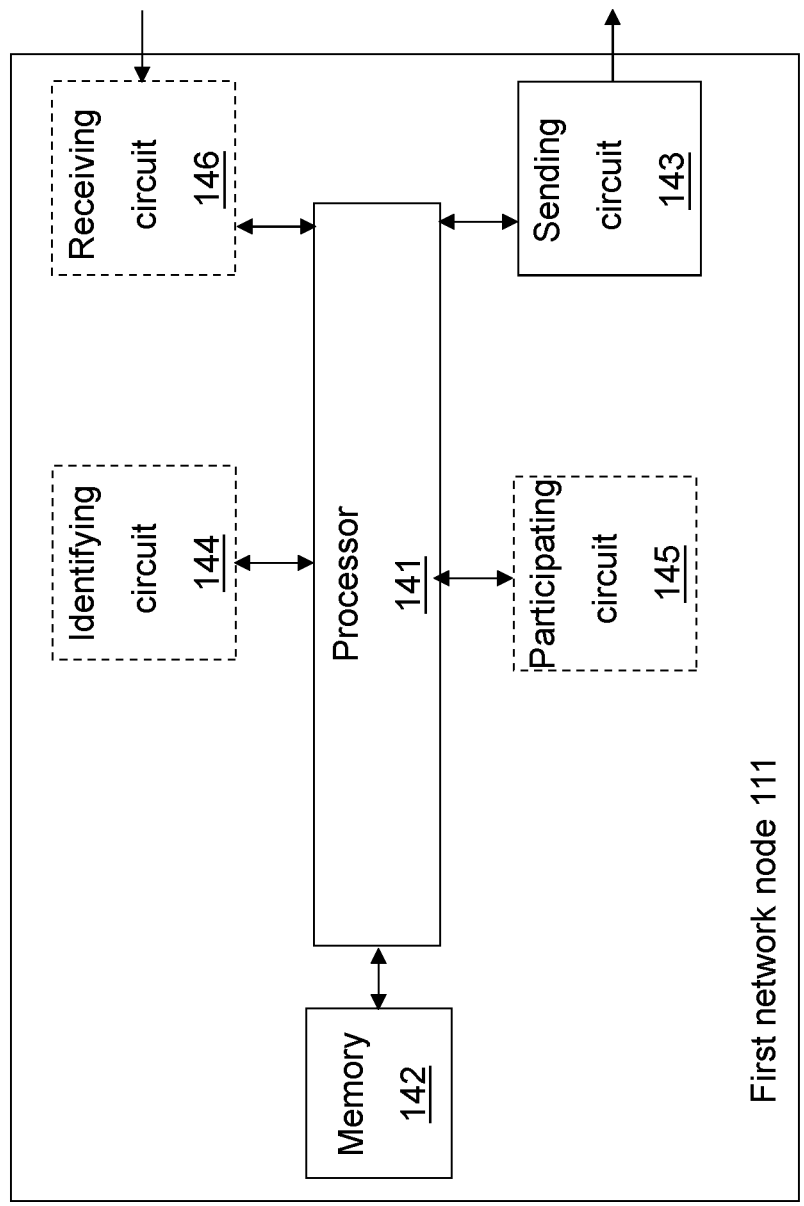
FIG. 16 is a schematic block diagram illustrating an example of a first network node implemented as a source base station according to an embodiment.

FIG. 16 is a schematic block diagram illustrating an example of a first network node implemented as a source base station according to an embodiment. The source base station 111 basically comprises a processor 141, a memory 142, and optional circuits such as a sending circuit 143, an identifying circuit 144, a participating circuit 145, and a receiving circuit 146.

As indicated in the particular example of FIG. 16, the source base station 111 comprises a processor 141 and a memory 142, wherein the memory 142 comprises instructions executable by the processor 141 to perform operations of the source base station.

Target Base Station

According to an example embodiment, the target base station 112 is configured to enable continuation of ongoing positioning measurements for a User Equipment, UE, 120 at handover from a source base station 111. The target base station 112 is configured to receive a measurement context associated with the ongoing positioning measurements from the source base station to enable continued positioning measurements in a target cell of the target base station after the handover has been completed. The target base station 112 is also configured to participate in continued positioning measurements in the target cell after the handover in response to the received measurement context.

By way of example, the target base station 112 is configured to prepare a report comprising the measurement context associated with the ongoing positioning measurements and measurement data resulting from continuation of the ongoing positioning measurements after the handover.

Figure 18:
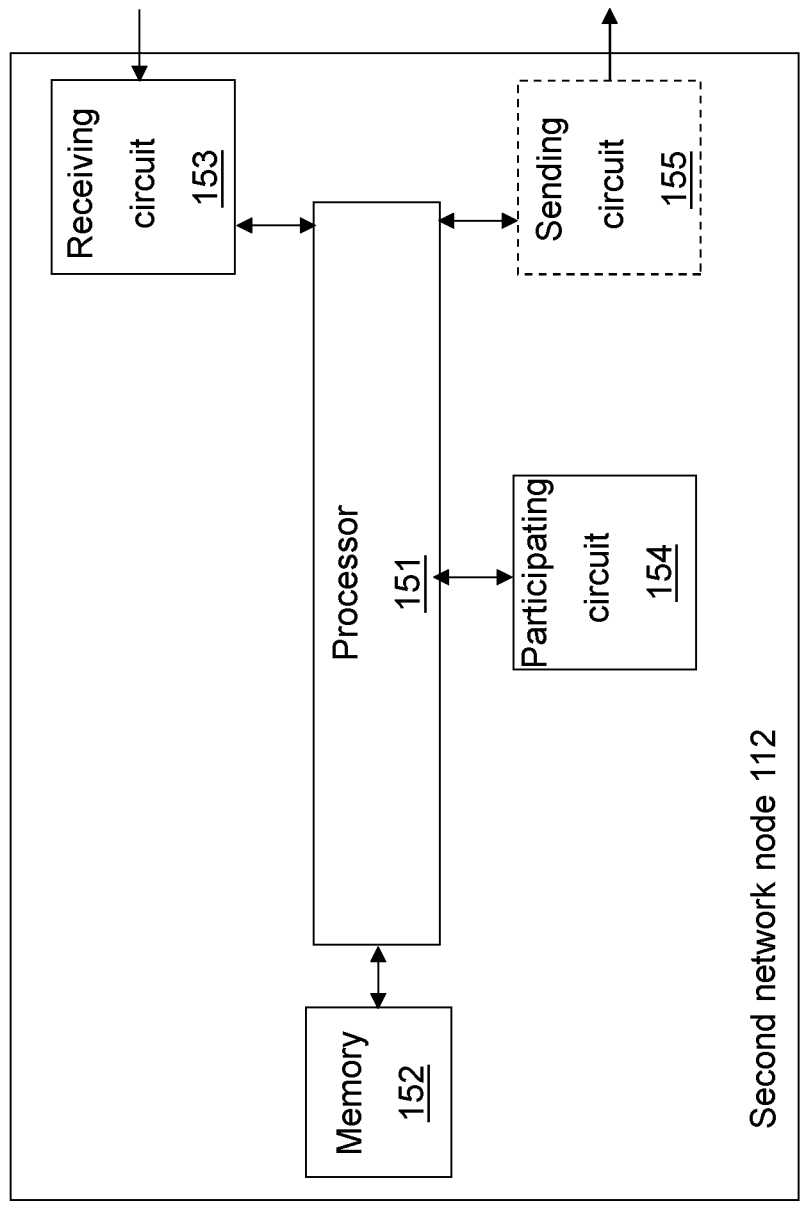
FIG. 18 is a schematic block diagram illustrating an example of a second network node implemented as a target base station according to an embodiment.

FIG. 18 is a schematic block diagram illustrating an example of a second network node implemented as a target base station according to an embodiment. The target base station 112 basically comprises a processor 151, a memory 152, and optional circuits such as a receiving circuit 153, a participating circuit 154, and a sending circuit 155.

As indicated in the particular example of FIG. 18, the target base station 112 comprises a processor 151 and a memory 152, wherein the memory 152 comprises instructions executable by the processor 151 to perform operations of the target base station.

It should be understood that the target base station or source base station may be configured to operate based on a HANDOVER REQUEST comprising a RRC Context IE into which the measurement context is incorporated.

Those skilled in the art will also appreciate that the one or more of the circuits described above may refer to a combination of analog and digital circuits, and/or one or more processors configured with software and/or firmware, e.g. stored in the memory, that when executed by the one or more processors such as the processors according to the above perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

As indicated herein, the network nodes and/or UE may alternatively be defined as a group of function modules, where the function modules are implemented as a computer program running on a processor.

The computer program residing in memory may thus be organized as appropriate function modules configured to perform, when executed by the processor, at least part of the steps and/or tasks described herein.

Figure 19:
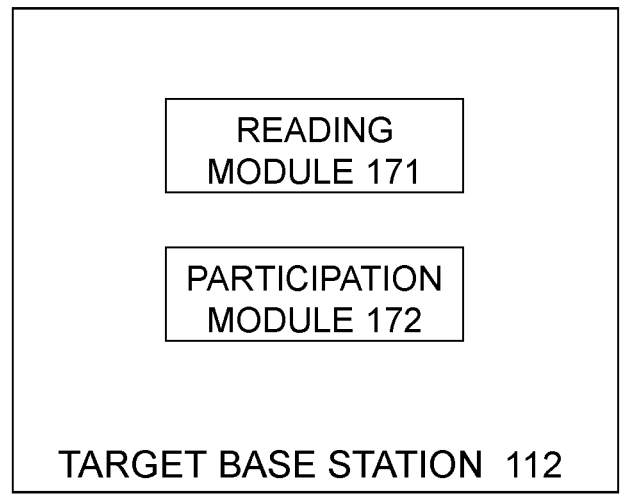
FIG. 19 is a schematic block diagram illustrating an example of a function module implementation of a target base station according to an embodiment.

FIG. 19 is a schematic block diagram illustrating an example of a function module implementation of a target base station according to an embodiment. In this example, the target base station 112 is configured for enabling continuation of ongoing positioning measurements for a User Equipment, UE, at handover from a source base station. The target base station comprises:

a reading module 171 for reading a measurement context associated with the ongoing positioning measurements from the source base station to enable continued positioning measurements in a target cell of the target base station after the handover has been completed; and a participation module 172 for participating in continued positioning measurements in the target cell after the handover in response to the measurement context.

With reference to the flow diagram of FIG. 6, the obtaining step will be regarded as a reading step from the perspective of the processor, when regarding the flow diagram of FIG. 6 as a computer flow diagram.

Figure 20:
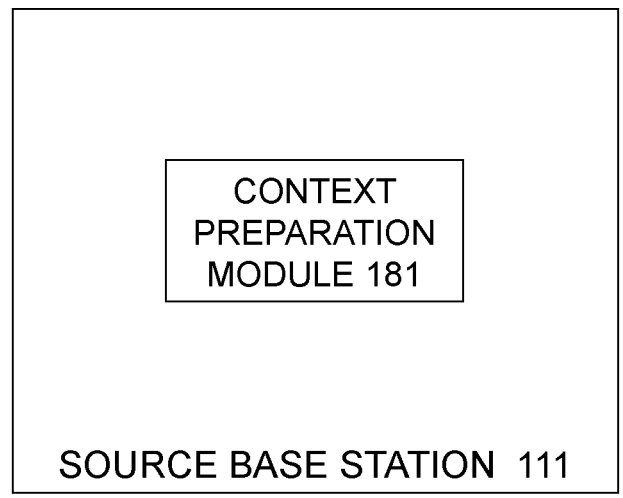
FIG. 20 is a schematic block diagram illustrating an example of a function module implementation of a source base station according to an embodiment.

FIG. 20 is a schematic block diagram illustrating an example of a function module implementation of a source base station according to an embodiment. In this example, the source base station 111 is configured for enabling continuation of ongoing positioning measurements for a User Equipment, UE, at handover to a target base station. The source base station comprises a context preparation module 181 for preparing a measurement context associated with the ongoing positioning measurements for transfer to the target base station to enable continued positioning measurements in a target cell of the target base station after the handover has been completed.

With reference to the flow diagram of FIG. 7, the providing step will be regarded as a preparing step from the perspective of the processor, when regarding the flow diagram of FIG. 7 as a computer flow diagram.

Figure 21:
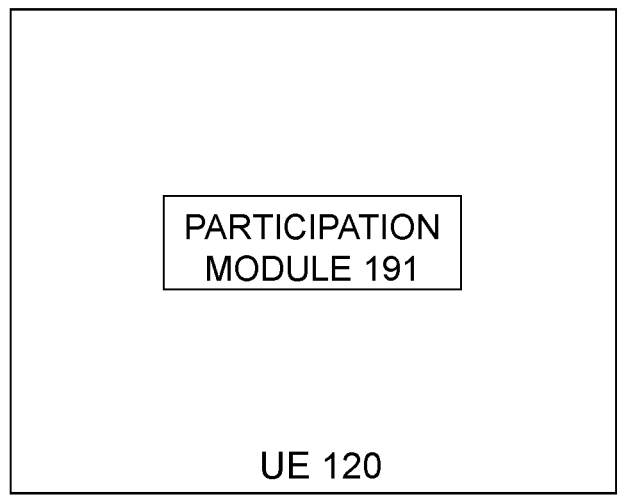
FIG. 21 is a schematic block diagram illustrating an example of a function module implementation of a UE according to an embodiment.

FIG. 21 is a schematic block diagram illustrating an example of a function module implementation of a UE according to an embodiment. In this example, the User Equipment, UE, 120 is configured for enabling continuation of ongoing positioning measurements for the UE at handover from a source base station to a separate target base station. The UE comprises a participation module 191 for participating in continued positioning measurements in a target cell of the target base station after the handover in response to a measurement context associated with the ongoing positioning measurement.

Figure 22:
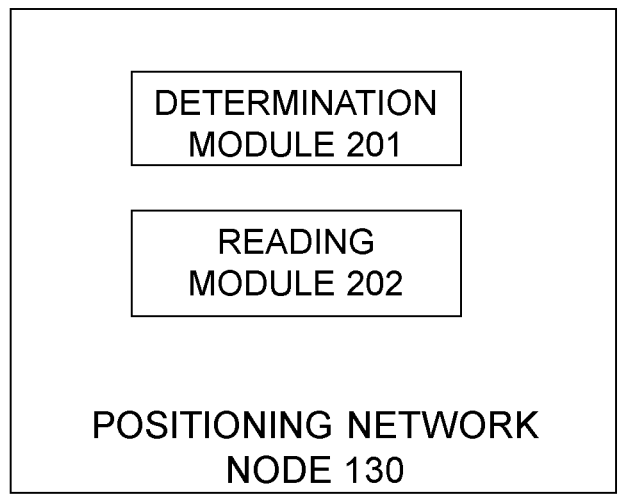
FIG. 22 is a schematic block diagram illustrating an example of a function module implementation of a positioning network node according to an embodiment.

FIG. 22 is a schematic block diagram illustrating an example of a function module implementation of a positioning network node according to an embodiment. In this example, the positioning network node 130 is configured for enabling continuation of ongoing positioning measurements for a User Equipment, UE, at handover from a source base station to a separate target base station. The positioning network node comprises:

a determination module 201 for determining that the UE is subject to handover during the ongoing positioning measurements; and a reading module 202 for reading a report comprising a measurement context associated with the ongoing positioning measurements and measurement data resulting from continuation of the ongoing positioning measurements after the handover.

With reference to the flow diagram of FIG. 9 and FIG. 10, the receiving step will be regarded as a reading step from the perspective of the processor, when regarding the flow diagram of FIG. 9 and FIG. 10 as a computer flow diagram.

When using the word "comprise" or "comprising" it shall be interpreted as non-limiting, i.e. meaning "consist at least of".

The embodiments herein are not limited to the above described preferred embodiments. Various alternatives, modifications and equivalents may be used. In particular, different part solutions in the different embodiments can be combined in other configurations, where technically possible. Therefore, the above embodiments should not be taken as limiting the scope of the invention, which is defined by the appending claims.

Abbreviations

3GPP 3rd Generation Partnership Project
A-GNSS Assisted GNSS
CID Cell ID
EPS Enhanced Packet System
eNB evolved Node B
E-CID Enhanced CID
E-SMLC Enhanced Serving Mobile Location Center
E-UTRAN Evolved Universal Terrestrial Radio Access Network
GLONASS GLObal'naya NAvigatsionnaya Sputnikovaya Sistema (Eng.: Global Navigation Satellite System)
GNSS Global Navigation Satellite System
GPS Global Positioning System
IE Information Element
IMS IP Multimedia Subsystem
LMU Location Measurement Unit
LTE Long Term Evolution
LPP LTE Positioning Protocol
LPPa LPP Annex
MDT Minimization of Drive Tests. MDT is a set of standardized functionalities to collect network information using the UE so that the operators can diagnose and optimize network performance avoiding or minimizing costly drive test campaigns.
MME Mobility Management Entity
OTDOA Observed Time Difference Of Arrival
PCell Primary serving Cell
PDU Protocol Data Unit
QZSS Quasi-Zenith Satellite System
RRC Radio Resource Control
Rx Reception
S1AP S1 Application Protocol
SBAS Space-Based Augmentation System
SRS Sounding Reference Signal
Tx Transmission
UE User Equipment
UTDOA Uplink Time Difference Of Arrival
X2AP X2 Application Protocol

REFERENCES

[1] 3GPP TS 36.305, V11.3.0, section 4.3.
[2] 3GPP TS 36.455, V11.2.0.
[3] 3GPP TS 36.423, V11.4.0.
[4] 3GPP TS 36.331, V11.3.0.
[5] 3GPP TS 36.413, V11.3.0.
[6] 3GPP TS 36.300, V11.5.0, section 3.
[7] 3GPP TS 36.355, V11.2.0.
[8] 3GPP TS 36.133, V11.4.0.
[9] R3-130453, "LS on UE Rx-Tx time difference measurement requirement under handover", 3GPP RAN4.
[10] R3-130507, "Discussion on E-CID positioning during handover", Huawei.

The invention claimed is:

1. A method for enabling continuation of ongoing positioning measurements for a User Equipment (UE) at handover from a source base station to a separate target base station, the method comprising the target base station:

receiving a message in conjunction with handover of the UE from the source base station to the target base station, the message including a measurement context for an ongoing positioning measurement involving the UE, the measurement context comprising one or more identifiers (IDs) used for identifying the positioning measurement at a positioning network node; and participating in a continuation of the positioning measurement after the handover is completed, including sending a report to at least one of the source base station and the positioning network node, the report including measurement data resulting from continuation of the positioning measurement after the handover and all or some of the measurement context, to thereby enable the source base station or the positioning network node to associate the report with the positioning measurement.

2. The method of claim 1, wherein the measurement context identifies a measurement session associated with the positioning measurement.

3. A method for enabling continuation of ongoing positioning measurements for a User Equipment (UE) at handover from a source base station to a separate target base station, the method comprising the source base station:

participating in a positioning measurement involving the UE and, while the positioning measurement is ongoing, handing the UE over to the target base station; and in conjunction with handing the UE over to the target base station, sending a measurement context for the positioning measurement to the target base station;

the measurement context comprising one or more identifiers (IDs) used for identifying the positioning measurement at a positioning network node, and thereby enabling the target base station to participate in a continuation of the positioning measurement after handover is completed.

4. The method of claim 3, further comprising the steps of:
receiving a report from the target base station comprising measurement data resulting from continuation of the positioning measurement after the handover; and
sending a further report to the positioning network node comprising the measurement context associated with the positioning measurement and the measurement data received in the report.

5. The method of claim 3, further comprising the source base station sending a failure indication to the positioning network node for the positioning measurement, in response to the handover of the UE from the source base station to the target base station.

6. The method of claim 3, wherein the measurement context is included in a HANDOVER REQUEST comprising a Radio Resource Control (RRC) Context Information Element (IE) into which the measurement context is incorporated by the source base station for the target base station.

7. A method for enabling continuation of ongoing positioning measurements for a User Equipment (UE) at handover from a source base station to a separate target base station, the method comprising the UE:
participating in a positioning measurement while being served by the source base station, the positioning measurement being associated with a measurement context comprising one or more identifiers (IDs) identifiers used for identifying the positioning measurement at a positioning network node;
undergoing handover from the source base station to the target base station while the positioning measurement is ongoing; and
participating in a continuation of the positioning measurement after handover, while being served by the target base station, including sending a report to at least one of the target base station and the positioning network node, the report including measurement data resulting from continuation of the positioning measurement after handover and all or some of the measurement context, to thereby enable the report to be associated with the positioning measurement.

8. The method of claim 7, wherein the report is sent from the UE to an Enhanced Serving Mobile Location Center (E-SMLC), as the positioning network node, over the Long Term Evolution (LTE) Positioning Protocol (LPP).

9. A method for enabling continuation of ongoing positioning measurements for a User Equipment (UE) at handover from a source base station to a separate target base station, the method comprising a positioning network node:
determining that the UE is subject to handover during a positioning measurement that is associated with the UE and the source base station;
delaying removal of a measurement context associated with the positioning measurement, the measurement context comprising one or more identifiers (IDs) used for identifying the positioning measurement at the positioning network node
receiving a report after the handover is completed, the report comprising the measurement context and measurement data resulting from continuation of the positioning measurement after the handover; and
at least when the report is received before removal of the measurement context at the positioning network node, recognizing the report as a continuation of the positioning measurement.

10. The method of claim 9, wherein the step of determining that the UE is subject to handover is based on receiving a measurement failure message from the source base station indicating failure of the positioning measurement, or based on receiving an indication that handover may occur, will occur or has occurred, or based on determining that a requested measurement report has not been received within a certain time.

11. The method of claim 9, wherein the measurement context further includes
a measurement configuration to continue the positioning measurement in the target cell.

12. The method of claim 11, wherein the measurement configuration is a Sounding Reference Signal (SRS) configuration and the one or more IDs include an Enhanced Serving Mobile Location Center (E-SMLC) UE Measurement ID and an eNB UE measurement ID and an optional Long Term Evolution (LTE) Positioning Protocol annex (LPPa) Transaction ID.

13. The method of claim 9, wherein the handover is an inter-eNB handover, and a positioning protocol used for the ongoing positioning measurements is the Long Term Evolution (LTE) Positioning Protocol annex (LPPa).

14. The method of claim 9, wherein the positioning measurement is an Enhanced Cell ID (E-CID) positioning measurement or an Uplink Time Difference of Arrival (UTDOA) positioning measurement.

15. A target base station configured to enable continuation of ongoing positioning measurements for a User Equipment (UE) at handover from a source base station, the target base station comprising:
communication circuitry configured for communicating at least with the UE and with the source base station; and
processing circuitry operatively associated with the communication circuitry and configured to:
receive a message in conjunction with handover of the UE from the source base station to the target base station, the message including a measurement context for an ongoing positioning measurement involving the UE, the measurement context comprising one or more identifiers (IDs) used for identifying the positioning measurement at a positioning network node; and
participate in a continuation of the positioning measurement after the handover is completed, including sending a report to at least one of the source base station and the positioning network node, the report including measurement data resulting from continuation of the positioning measurement after the handover and all or some of the measurement context, to thereby enable the source base station or the positioning network node to associate the report with the positioning measurement.

16. The target base station of claim 15, wherein the processing circuitry comprises a processor and a memory, wherein the memory stores instructions executable by the processor to perform operations of the target base station.

17. A source base station configured to enable continuation of ongoing positioning measurements for a User Equipment (UE) at handover to a target base station, the source base station comprising:

communication circuitry configured for communicating at least with the UE and the target base station; and processing circuitry operatively associated with the communication circuitry and configured to:

participate in a positioning measurement involving the UE and, while the positioning measurement is ongoing, handing the UE over to the target base station; and in conjunction with handing the UE over to the target base station, send a measurement context for the positioning measurement to the target base station;

the measurement context comprising one or more identifiers (IDs) used for identifying the positioning measurement at a positioning network node, and thereby enabling the target base station to participate in a continuation of the positioning measurement after handover is completed.

18. The source base station of claim 17, wherein the processing circuitry is configured to send a failure indication to the positioning network node for the positioning measurement, in response to the handover of the UE to the target base station, and further wherein the processing circuitry is configured to receive a report from the target base station comprising measurement data resulting from continuation of the positioning measuring after the handover and to send a further report to the positioning network node comprising the measurement context and the measurement data resulting from continuation of the positioning measurement after the handover.

19. The source base station of claim 17, wherein the processing circuitry comprises a processor and a memory, wherein the memory stores instructions executable by the processor to perform operations of the source base station.

20. The source base station of claim 17, wherein the measurement context is included in a HANDOVER REQUEST comprising a Radio Resource Control (RRC) Context Information Element (IE) into which the measurement context is incorporated by the source base station for the target base station.

21. A User Equipment (UE) configured to enable continuation of ongoing positioning measurements for the UE at handover from a source base station to a separate target base station, the UE comprising:

communication circuitry configured at least for communicating with the source and target base stations; and processing circuitry operatively associated with the communication circuitry and configured to:

participate in a positioning measurement while being served by the source base station, the positioning measurement being associated with a measurement context comprising one or more identifiers (IDs) used for identifying the positioning measurement at a positioning network node;

undergo handover from the source base station to the target base station while the positioning measurement is ongoing; and participate in a continuation of the positioning measurement after handover, while being served by the target base station, including sending a report to at least one of the target base station and the positioning network node, the report including measurement data resulting from continuation of the positioning measurement after handover and all or some of the measurement context, to thereby enable the report to be associated with the positioning measurement.

22. The UE of claim 21, wherein the processing circuitry comprises a processor and a memory, wherein the memory stores instructions executable by the processor to perform operations of the UE.

23. A positioning network node configured to enable continuation of ongoing positioning measurements for a User Equipment (UE) at handover from a source base station to a separate target base station, the positioning network node comprising:

communication circuitry configured for communicating with the source and target base stations; and processing circuitry operatively associated the communication circuitry and configured to:

determine that the UE is subject to handover during a positioning measurement that is associated with the UE and the source base station;

delay removal of a measurement context associated with the positioning measurement, the measurement context comprising one or more identifiers (IDs) used for identifying the positioning measurement at the positioning network node;

receive a report after the handover is completed, the report comprising the measurement context and measurement data resulting from continuation of the positioning measurement after the handover; and at least when the report is received before removal of the measurement context at the positioning network node, recognizing the report as a continuation of the positioning measurement.

24. The positioning network node of claim 23, wherein the processing circuitry is configured to determine that the UE is subject to handover based on receiving a measurement failure message from the source base station indicating failure of the positioning measurement, or based on receiving an indication that handover may occur, will occur or has occurred, or based on determining that a requested measurement report has not been received within a certain time.

25. The positioning network node of claim 23, wherein the processing circuitry comprises a processor and a memory, wherein the memory stores instructions executable by the processor to perform operations of the positioning network node.

26. A method of operation in a wireless communication network, the method comprising:

starting a positioning measurement involving a source base station and a user equipment (UE), while the user equipment is being served by a source cell in the wireless communication network, wherein the positioning measurement is identified by a measurement context known to the source base station and the measurement context is associated with a positioning session at a positioning network node; and continuing the positioning measurement after a handover of the UE to a target cell in the wireless communication network, based on providing a target base station associated with the target cell with the measurement context, and further based on the target base station obtaining measurement data for the positioning measurement after the handover is complete and using the measurement context to report the measurement data directly or indirectly to the positioning network node.

* * * * *

UNITED STATES PATENT AND TRADEMARK OFFICE
CERTIFICATE OF CORRECTION

PATENT NO. : 9,894,575 B2  
APPLICATION NO. : 14/889777  
DATED : February 13, 2018  
INVENTOR(S) : Masini et al.

Page 1 of 1

It is certified that error appears in the above-identified patent and that said Letters Patent is hereby corrected as shown below:

In the Specification

In Column 2, in Table 1, under "SUPL", Line 4, delete "assisted" and insert -- assisted) --, therefor.

In the Claims

In Column 26, Line 67, in Claim 3, delete "station; and" and insert -- station; --, therefor.

In Column 27, Line 3, in Claim 3, delete "station;" and insert -- station; and --, therefor.

In Column 27, Line 65, in Claim 9, delete "node" and insert -- node; --, therefor.

Signed and Sealed this  
Seventeenth Day of April, 2018

Andrei Iancu  
*Director of the United States Patent and Trademark Office*